US011397904B2

(12) United States Patent
Lippow et al.

(10) Patent No.: US 11,397,904 B2
(45) Date of Patent: *Jul. 26, 2022

(54) SYSTEMS AND METHODS OF GENERATING ITINERARIES USING LOCATION DATA

(71) Applicant: GOOGLE LLC, Mountain View, CA (US)

(72) Inventors: Margaret Aycinena Lippow, San Carlos, CA (US); Amir Jonatan Padovitz, Mountain View, CA (US); Akshay Narendra Java, Mountain View, CA (US); Bala Venkata Sai Ravi Krishna Kolluri, Oakland, CA (US)

(73) Assignee: GOOGLE LLC, Mountain View, CA (US)

( * ) Notice: Subject to any disclaimer, the term of this patent is extended or adjusted under 35 U.S.C. 154(b) by 405 days.

This patent is subject to a terminal disclaimer.

(21) Appl. No.: 16/502,476

(22) Filed: Jul. 3, 2019

(65) Prior Publication Data

US 2019/0325357 A1 Oct. 24, 2019

Related U.S. Application Data

(63) Continuation of application No. 14/968,878, filed on Dec. 14, 2015, now Pat. No. 10,366,354.

(30) Foreign Application Priority Data

Dec. 14, 2014 (IL) .......................................... 236234

(51) Int. Cl.
*G06Q 10/02* (2012.01)
*G06Q 30/06* (2012.01)
*G06Q 50/14* (2012.01)

(52) U.S. Cl.
CPC ....... *G06Q 10/025* (2013.01); *G06Q 30/0625* (2013.01); *G06Q 50/14* (2013.01)

(58) Field of Classification Search
CPC ... G06Q 10/025; G06Q 30/0625; G06Q 50/14
See application file for complete search history.

(56) References Cited

U.S. PATENT DOCUMENTS 5,948,040 A 9/1999 DeLorme et al.
7,174,301 B2 * 2/2007 Florance .............. G06Q 10/025
705/313

(Continued)

OTHER PUBLICATIONS

Chen, Gang, Wu, Sai, Zhou, Jingbo, and Tung, Anthony K.H., "Automatic Itinerary Planning for Traveling Services," IEEE Transactions on Knowledge and Data Engineering, vol. 26, No. 3, Mar. 2014, pp. 514-527.*

(Continued)

*Primary Examiner* — Nathan Erb
(74) *Attorney, Agent, or Firm* — Dority & Manning, P.A.

(57) ABSTRACT

A data processing system receives location data points from computing devices. The system annotates the location data points with entities and determines a duration each of the computing devices was at corresponding entities. The system aggregates the location data points into a set of sequences based on the duration and the entities and stores the set of sequences in a data record. The system accesses the database record including a set of sequences generated from location data points received from computing devices. The system receives, from a computing device, a request for a location sequence that includes a query. The system identifies an attribute of the computing device. The system identifies a sequence based on the set of sequences using the query and the attribute. The system transmits the sequence for display on a display device.

20 Claims, 13 Drawing Sheets

(56) References Cited

U.S. PATENT DOCUMENTS

| | | | |
|---|---|---|---|
| 7,363,319 B2* | 4/2008 | Cappellini | G06Q 10/08 |
| 7,610,151 B2 | 10/2009 | Letchner et al. | |
| 7,711,475 B1 | 5/2010 | Cona et al. | |
| 8,000,893 B1 | 8/2011 | Cona et al. | |
| 8,155,986 B2 | 4/2012 | Deljo et al. | |
| 8,332,247 B1 | 12/2012 | Bailey et al. | |
| 8,355,936 B2 | 1/2013 | Altaf et al. | |
| 8,407,099 B1 | 3/2013 | Frank et al. | |
| 8,463,286 B2 | 6/2013 | Maranhas et al. | |
| 8,510,315 B2 | 8/2013 | Zheng et al. | |
| 8,718,925 B2 | 5/2014 | Letchner et al. | |
| 8,756,109 B1 | 6/2014 | Frank et al. | |
| 8,818,715 B2 | 8/2014 | Mahapatro et al. | |
| 8,843,157 B2 | 9/2014 | Miyake et al. | |
| 8,855,684 B2 | 10/2014 | Bellver et al. | |
| 8,903,870 B2 | 12/2014 | Turk et al. | |
| 9,087,344 B2 | 7/2015 | Maranhas et al. | |
| 9,170,863 B2 | 10/2015 | Varoglu et al. | |
| 9,183,685 B2 | 11/2015 | Ricci | |
| 9,204,254 B2 | 12/2015 | Hawkins et al. | |
| 9,208,472 B2 | 12/2015 | Mital et al. | |
| 9,280,605 B2 | 3/2016 | Tilden et al. | |
| 9,299,116 B2 | 3/2016 | Williams | |
| 9,471,599 B2 | 10/2016 | Varoglu et al. | |
| 9,714,831 B2 | 7/2017 | Kapoor et al. | |
| 9,922,047 B2 | 3/2018 | Varoglu et al. | |
| 9,976,864 B2 | 5/2018 | Kahn et al. | |
| 10,366,354 B2* | 7/2019 | Lippow | G06Q 50/14 |
| 2004/0044605 A1 | 3/2004 | Kress Bodin et al. | |
| 2004/0215699 A1 | 10/2004 | Purang et al. | |
| 2005/0027442 A1 | 2/2005 | Kelley et al. | |
| 2005/0234748 A1 | 10/2005 | Kaplan | |
| 2006/0155591 A1 | 7/2006 | Altaf et al. | |
| 2007/0094056 A1 | 4/2007 | Kang et al. | |
| 2007/0106468 A1 | 5/2007 | Eichenbaum et al. | |
| 2007/0112606 A1 | 5/2007 | Deljo et al. | |
| 2007/0185744 A1 | 8/2007 | Robertson et al. | |
| 2007/0225903 A1 | 9/2007 | Liebling et al. | |
| 2007/0288138 A1 | 12/2007 | Bodin et al. | |
| 2007/0299599 A1 | 12/2007 | Letchner et al. | |
| 2008/0046298 A1 | 2/2008 | Ben-Yehuda et al. | |
| 2008/0090554 A1 | 4/2008 | Kalpan et al. | |
| 2008/0167886 A1 | 7/2008 | De Marcken | |
| 2008/0167906 A1 | 7/2008 | De Marcken | |
| 2008/0167907 A1 | 7/2008 | De Marcken | |
| 2008/0167908 A1 | 7/2008 | De Marcken | |
| 2008/0167909 A1 | 7/2008 | De Marcken | |
| 2008/0167912 A1 | 7/2008 | De Marcken | |
| 2008/0167973 A1 | 7/2008 | De Marcken | |
| 2008/0168093 A1 | 7/2008 | De Marcken | |
| 2008/0177584 A1 | 7/2008 | Altaf et al. | |
| 2008/0189143 A1 | 8/2008 | Wurster | |
| 2008/0189144 A1 | 8/2008 | Wurster | |
| 2008/0189145 A1 | 8/2008 | Wurster | |
| 2008/0189207 A1 | 8/2008 | Wurster | |
| 2008/0189226 A1 | 8/2008 | Wurster | |
| 2009/0143977 A1 | 6/2009 | Beletski et al. | |
| 2009/0271104 A1 | 10/2009 | Letchner et al. | |
| 2009/0271226 A1 | 10/2009 | De Marcken | |
| 2010/0169131 A1 | 7/2010 | Robertson | |
| 2010/0250292 A1 | 9/2010 | Wurster | |
| 2010/0257105 A1 | 10/2010 | Wurster | |
| 2010/0262362 A1 | 10/2010 | Naito et al. | |
| 2010/0305983 A1 | 12/2010 | De Marcken | |
| 2011/0161271 A1 | 6/2011 | Purang et al. | |
| 2011/0167028 A1 | 7/2011 | Purang et al. | |
| 2011/0225257 A1 | 9/2011 | Tilden et al. | |
| 2011/0282680 A1 | 11/2011 | Pfeffer et al. | |
| 2011/0301835 A1* | 12/2011 | Bongiorno | G06Q 10/02 705/6 |
| 2012/0101858 A1 | 4/2012 | Depasquale et al. | |
| 2012/0143882 A1 | 6/2012 | Zheng et al. | |
| 2012/0209842 A1 | 8/2012 | Bettridge et al. | |
| 2012/0239443 A1 | 9/2012 | Miller et al. | |
| 2012/0278092 A1 | 11/2012 | Pfeffer et al. | |
| 2013/0030849 A1 | 1/2013 | Bongiorno | |
| 2013/0041696 A1 | 2/2013 | Richard | |
| 2013/0073323 A1 | 3/2013 | Zacharia et al. | |
| 2013/0122937 A1 | 5/2013 | Meyer et al. | |
| 2013/0124238 A1 | 5/2013 | Burrows et al. | |
| 2013/0218682 A1 | 8/2013 | Alterman et al. | |
| 2013/0249948 A1 | 9/2013 | Reitan | |
| 2013/0261957 A1* | 10/2013 | Mahapatro | G06Q 10/047 701/426 |
| 2013/0325557 A1 | 12/2013 | Ricci et al. | |
| 2014/0082062 A1 | 3/2014 | Bellver et al. | |
| 2014/0223448 A1 | 8/2014 | Varoglu et al. | |
| 2014/0257949 A1 | 9/2014 | Gishen | |
| 2014/0372154 A1 | 12/2014 | Scott | |
| 2015/0006256 A1 | 1/2015 | Kressner | |
| 2015/0024784 A1 | 1/2015 | Bellver et al. | |
| 2015/0032484 A1 | 1/2015 | Mermelstein | |
| 2015/0046201 A1 | 2/2015 | Miller et al. | |
| 2015/0057837 A1 | 2/2015 | Moore, Jr. | |
| 2015/0127486 A1 | 5/2015 | Advani | |
| 2015/0163256 A1 | 6/2015 | Frank | |
| 2015/0198722 A1 | 7/2015 | Ben-Akiva et al. | |
| 2015/0286959 A1 | 10/2015 | Hauviller et al. | |
| 2015/0356771 A1 | 12/2015 | Xu et al. | |
| 2015/0370903 A1 | 12/2015 | Schuller | |
| 2016/0003620 A1 | 1/2016 | Kapoor et al. | |
| 2016/0069705 A1 | 3/2016 | Brenner et al. | |
| 2016/0091334 A1 | 3/2016 | Chakra et al. | |
| 2016/0097646 A1 | 4/2016 | Alonso et al. | |
| 2016/0110382 A1 | 4/2016 | Varoglu et al. | |
| 2016/0117618 A1 | 4/2016 | Wang et al. | |
| 2016/0125559 A1 | 5/2016 | Shekou | |
| 2016/0171395 A1 | 6/2016 | Lippow et al. | |
| 2016/0247098 A1 | 8/2016 | Bongiorno | |
| 2016/0247396 A1 | 8/2016 | Xu et al. | |
| 2016/0298979 A1 | 10/2016 | Tucker | |
| 2016/0305789 A1 | 10/2016 | Brenner et al. | |
| 2016/0379484 A1 | 12/2016 | Kashiwai et al. | |
| 2017/0046802 A1 | 2/2017 | Zhang et al. | |
| 2017/0255645 A1 | 9/2017 | Varoglu et al. | |
| 2017/0292846 A1 | 10/2017 | Brenner et al. | |
| 2018/0143026 A1 | 5/2018 | Greenberg | |
| 2018/0150921 A1 | 5/2018 | Greenberg | |
| 2018/0224292 A1 | 8/2018 | Tucker | |

OTHER PUBLICATIONS

Chen "Automatic Itinerary Planning for Traveling Service", IEEE Transactions on Knowledge and Data Engineering, vol. 26, No. 3, Mar. 2014, 514-527.

Erb "U.S. Office Action issued in copending U.S. Appl. No. 14/968,878, filed Dec. 14, 2015", dated Jun. 27, 2018, 11 pages.

U.S. Appl. No. 14/968,878 to Margaret Aycinena Lippow et al., filed Dec. 14, 2015.

* cited by examiner

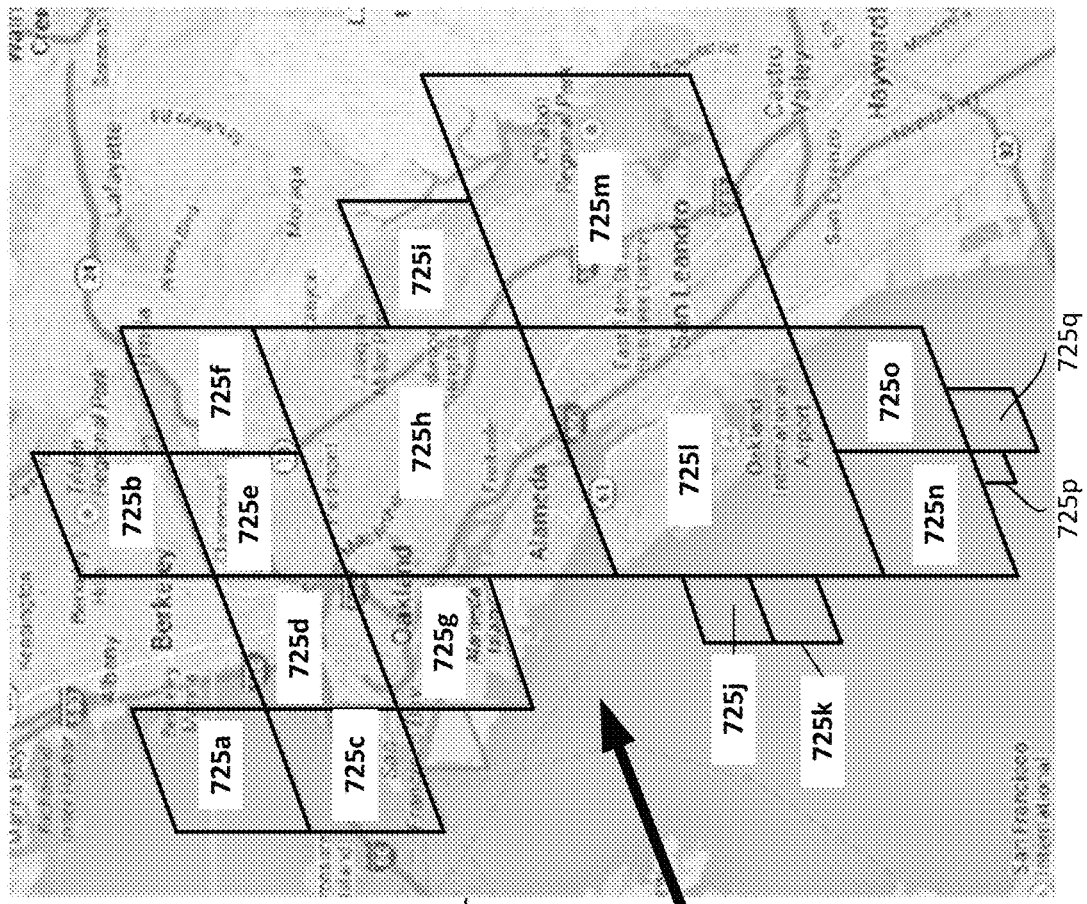
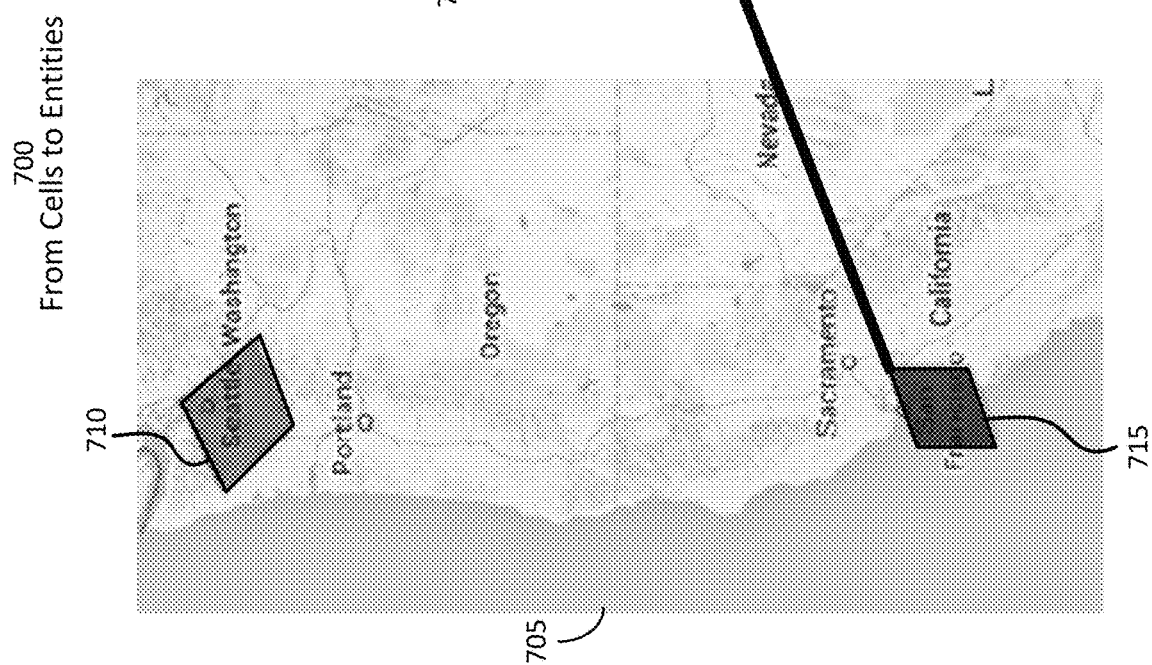
FIG. 7

SYSTEMS AND METHODS OF GENERATING ITINERARIES USING LOCATION DATA

BACKGROUND

In a networked environment such as the Internet, people or companies can provide information for public display on web pages or other documents. The web pages can include text, video, or audio information provided by the entities via a web page server for display on the internet. Additional content can also be provided by third parties for display on the web pages together with the information provided by the entities. Thus, a person viewing a web page can access the information that is the subject of the web page, as well as third party content that may appear with the web page.

SUMMARY

At least one aspect is directed to a method of optimizing generation of a travel itinerary via a computer network. The method includes a data processing system having at least one processor accessing a database record. The database record includes a set of sequences generated from location data points received from a plurality of computing devices. Each sequence in the set of sequences includes a plurality of durations corresponding to a plurality of locations. The method includes a matching engine of the data processing system receiving, from a computing device via the computer network, a request for a location sequence that includes a query. The method includes the data processing system identifying an attribute of the computing device. The method includes the matching engine selecting a first sequence based on the set of sequences using the query and the attribute. The method includes the data processing system transmitting the first sequence for display on a display device communicatively coupled with the computing device. The data processing system transmits the first sequence via the responsive to the request.

The method can include the data processing system identifying a temporal constraint based on the query. The method can include the data processing system selecting the first sequence based on the temporal constraint. The method can include the data processing system selecting a plurality of geo-diverse sequences using the query and the attribute and transmit them for display on the display device.

The method can also include the data processing system annotating the location data points with entities. The entities can include at least one of a point of interest, a city, a state, a country or a geographic region. The attribute can include a current location of the computing device. The method can include the data processing system determining, for the computing device, the attribute based on a location that satisfies a temporal threshold. The data processing system can select a subset of the set of sequences that satisfies the query and the attribute, or can select the first sequence based on one or more parameters or techniques, including, e.g., based on a frequency of occurrence in the subset.

The method can include the data processing system receiving, via an interface, the location data points from each of the plurality of computing devices. The method can include an entity engine of the data processing system annotating the location data points with entities. The method can include a location engine of the data processing system determining a duration each of the plurality of computing devices was at corresponding entities using a probabilistic technique. The method can include the location engine aggregating the location data points from each of the plurality of computing devices to generate the set of sequences based on the duration and the entities. The method can include the data processing system storing the set of sequences in the data record.

The method can include the data processing system filtering the location data points based on a distance threshold to identify the location data points corresponding to trips. The method can include the data processing system aggregating the location data points corresponding to trips to generate the set of sequences. The method can include the data processing system filtering the location data points based on a temporal threshold and a distance threshold to identify the location data points corresponding to trips. The method can include the data processing system aggregating the location data points corresponding to trips to generate the set of sequences. The method can include the data processing system grouping the location data points into cells having a fixed granularity. The method can include the data processing system determining the duration for each of the entities using a smearing technique.

The method can include the data processing system receiving the location data points. The location data points can correspond to trips taken by the plurality of computing devices. The method can include the data processing system applying a frequent itemset mining technique to the plurality of location data points to generate unordered sets of locations. The method can include the data processing system comparing each of the trips with the unordered sets of locations to determine a similarity. The method can include the data processing system generating the set of sequences responsive to the similarity of each of the trips to the unordered sets of locations satisfying a similarity threshold. The method can include the data processing system generating a mixing parameter for each of the unordered sets of location using a first expectation maximization technique. The method can include the data processing system determining durations for locations of the unordered sets of locations using a second expectation maximization technique. The first and second expectation maximization techniques may be the same expectation maximization technique, or different expectation maximization techniques having different formulas, functions, or weighting, parameters.

Another aspect is directed to a system for optimized generation of a travel itinerary via a computer network. The system includes a data processing system having at least one processor. The data processing system accesses a database record including a set of sequences generated from location data points received from a plurality of computing devices. Each sequence in the set of sequences identifies a plurality of durations corresponding to a plurality of locations. A matching engine of the data processing system receives, from a computing device via the computer network, a request for a location sequence that includes a query. The data processing system identifies an attribute of the computing device. The matching engine identifies a first sequence based on the set of sequences using the query and the attribute. The data processing system transmits, via the network responsive to the request, the first sequence for display on a display device communicatively coupled with the computing device.

The data processing system can identify a temporal constraint based on the query, or can select the first sequence based on the temporal constraint. The data processing system can annotate the location data points with entities, the entities comprise at least one of a point of interest, a city, a state, a country or a geographic region. The attribute can include a current location of the computing device.

The data processing system can determine, for the computing device, the attribute based on a location that satisfies a temporal threshold. The data processing system can select a subset of the set of sequences that satisfies the query and the attribute, or can select the first sequence or multiple sequences based on a frequency of occurrence in the subset.

The data processing system can include an interface, an entity engine, and a location engine. The interface can receive the location data points from each of the plurality of computing devices. The entity engine can annotate the location data points with entities. The location engine can determine a duration each of the plurality of computing devices was at corresponding entities using a probabilistic technique. The location engine can aggregate the location data points from each of the plurality of computing devices into the set of sequences based on the duration and the entities. The data processing system can store the set of sequences in the data record.

The data processing system can also filter the location data points based on a distance threshold to identify the location data points corresponding to trips. The data processing system can aggregate the location data points corresponding to trips to generate the set or sequences. The data processing system is further configured to group the location data points into cells having a fixed granularity.

At least one aspect is directed to a non-transitory computer readable medium storing instructions that, when executed by one or more processors, optimizes generation of a travel itinerary via a computer network. The instructions can include instructions to access a database record that includes a set of sequences generated from location data points received from a plurality of computing devices. A first sequence in the set of sequences can identify a first duration for a first location, and a second duration for a second location that sufficiently maps to trips taken by a subset of the plurality of computing devices. The instructions can include instructions to receive, from a computing device via the computer network, a request for a location sequence that includes a query. The instructions can include instructions to identify an attribute of the computing device. The instructions can include instructions to identify the first sequence from the set of sequences using the query and the attribute. The instructions can include instructions to transmit the first sequence for display on a display device communicatively coupled with the computing device. The instructions can include instructions to transmit the first sequence via the network responsive to the request.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIG. 7 is an illustration of transforming location data points from cells to entities in accordance with an implementation.

Like reference numbers and designations in the various drawings indicate like elements.

DETAILED DESCRIPTION

The systems and methods described herein generally relate to optimizing the generation of a travel itinerary using raw location history data received from devices that have opted-in to provide this information. A data processing system can use a location history timeline to determine that a computing device is located at a base location (e.g., a home, work, or regularly visited location), or on a trip remote from the home location. The data processing system can annotate the detected home and trip locations with entities such as points-of-interests, cities, regions, or countries, for example. The data processing system can further estimate how much time was spent within each entity, while accounting for anomalies in the data. The data processing system can aggregate statistics or other data from detected home or trip locations for a number of computing devices. For example, the data processing system can receive queries such as "Italy for seven days". In this example, the data processing system can identify, responsive to the received query, actual visited vacation destinations, e.g., at a city, venue, or resort area level of granularity, of a statistically relevant number of computing devices that have affirmatively opted to make location information available.

Figure 2A:
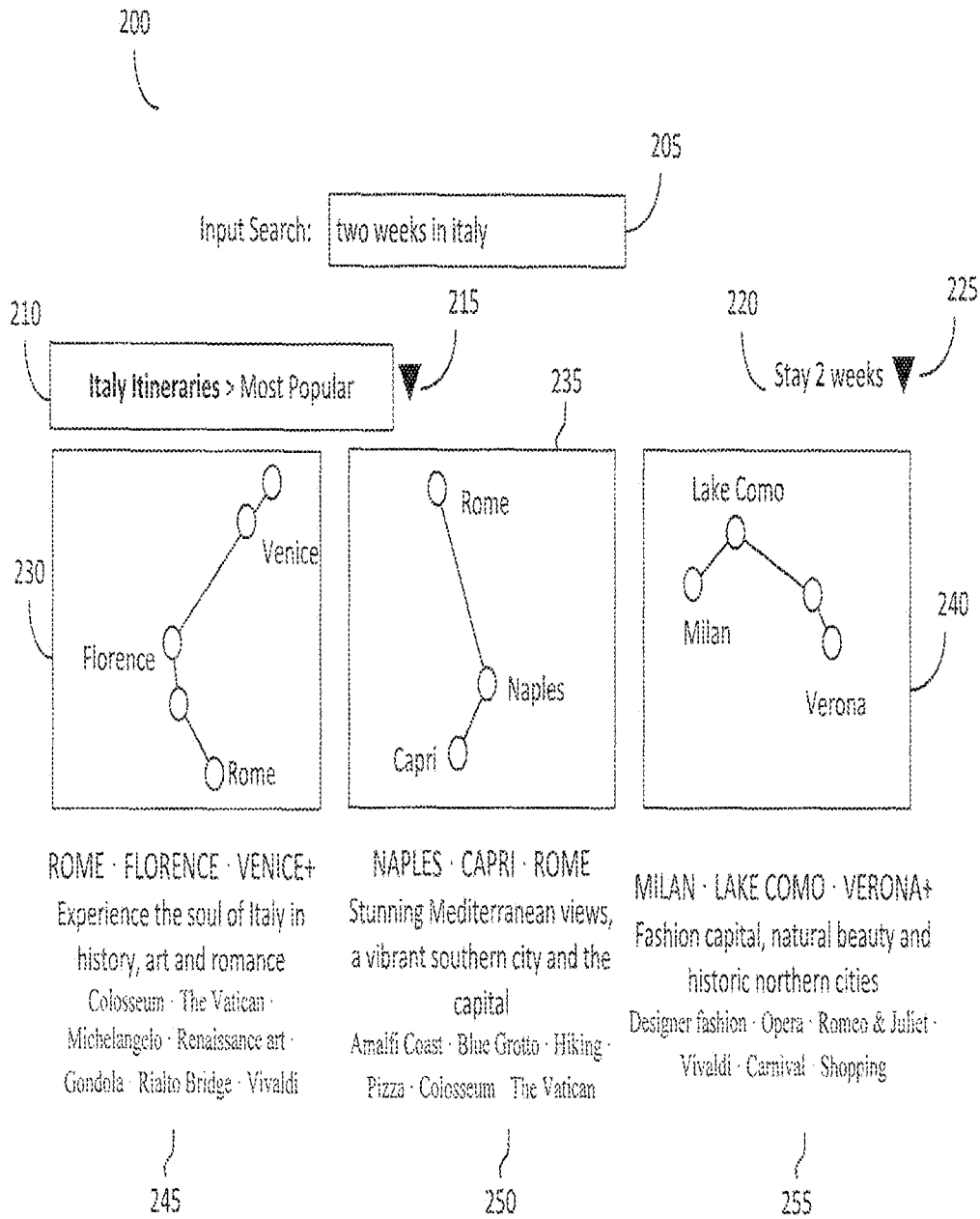
FIGS. 2A-2B are illustrations of graphical user interfaces of a system for optimization of generation of a travel itinerary in accordance with implementations.
Figure 2B:
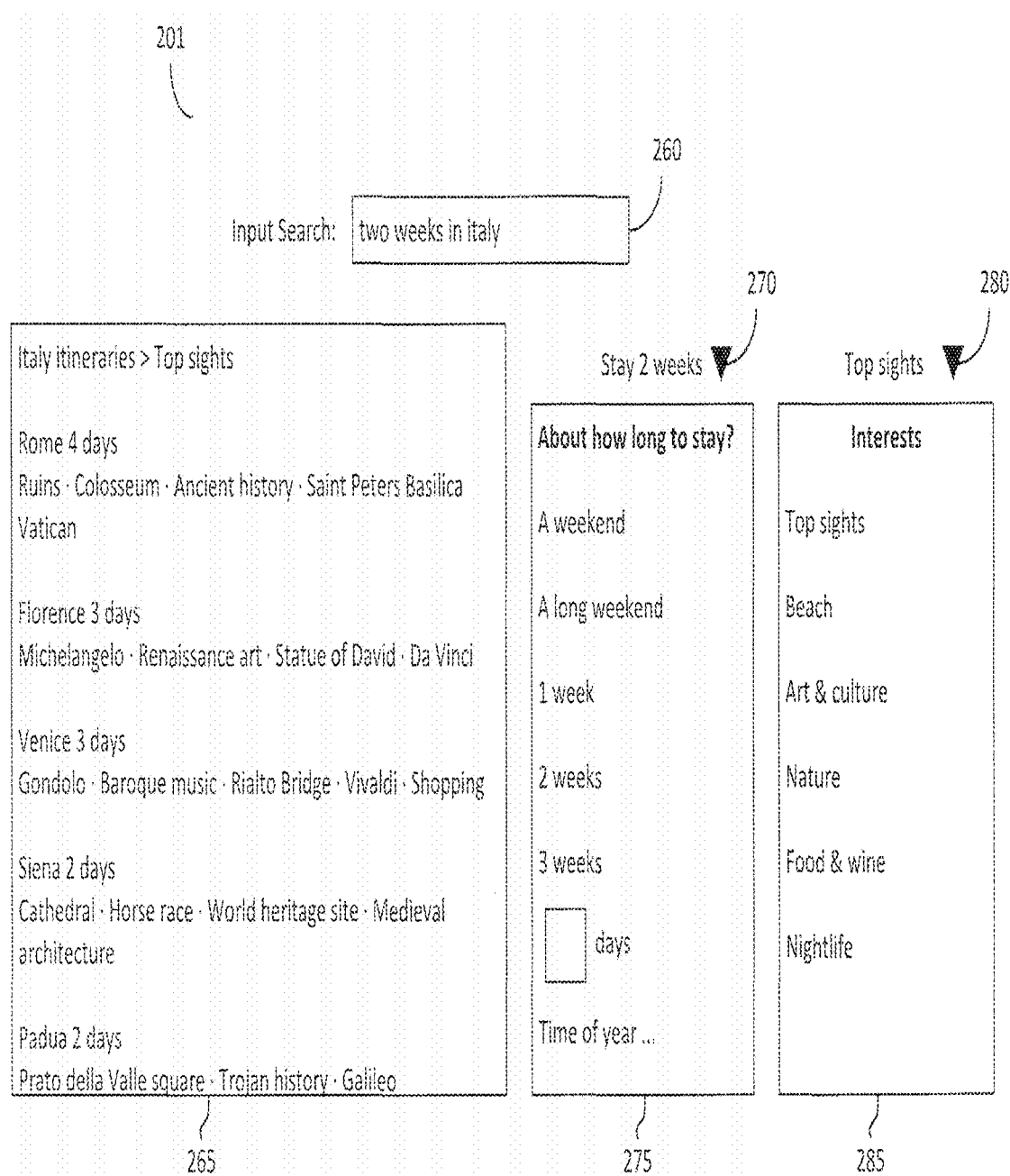

The data processing system can receive a request from a computing device for a travel itinerary in the form of a query. The query can include a temporal or other constraint. For example, the data processing system can receive a query from a computing device for "a seven day Italian vacation" or "two weeks in italy" as illustrated in FIGS. 2A and 2B. With affirmative consent, the data processing system can also receive or determine information about the computing device (e.g., a home or work location of computing device, a current location of computing device, or a type of the computing device). The data processing system can use this information about the computing device making the query and the information regarding actual vacation destinations associated with other computing devices to generate and provide an itinerary responsive to the request. For example, the data processing system can evaluate the detected trips (e.g., actual destinations) associated with other computing devices to identify popular itineraries that satisfy the constraints or other criteria of the query and that also satisfy the information about the computing device. The data processing system can aggregate across the matching user trips to generate one or more itineraries to show. For example, the data processing system can score or rank sequences of locations from detected trips (e.g., vacations associated with other computing devices) that satisfy the constraints in order to generate one or more popular travel itinerary responsive to the query, as shown in FIGS. 2A and 2B. The data processing system can also identify popular itineraries based at least in part on preferred categories of information: (e.g., beach, hiking, museums, or wine) that may be included with the query, as shown in FIG. 2B.

By generating a travel itinerary based on actual vacation destinations (e.g., visited locations associated with computing devices that are remote from a determined home locations) as well as anonymous or generic information associated with a computing device making a query for an itinerary (e.g., a country of origin associated with the querying computing device), the data processing system provides an improved product—e.g., a travel itinerary for display by the querying computing device—relative to other displays that may not consider or sufficiently consider these criteria.

Figure 1:
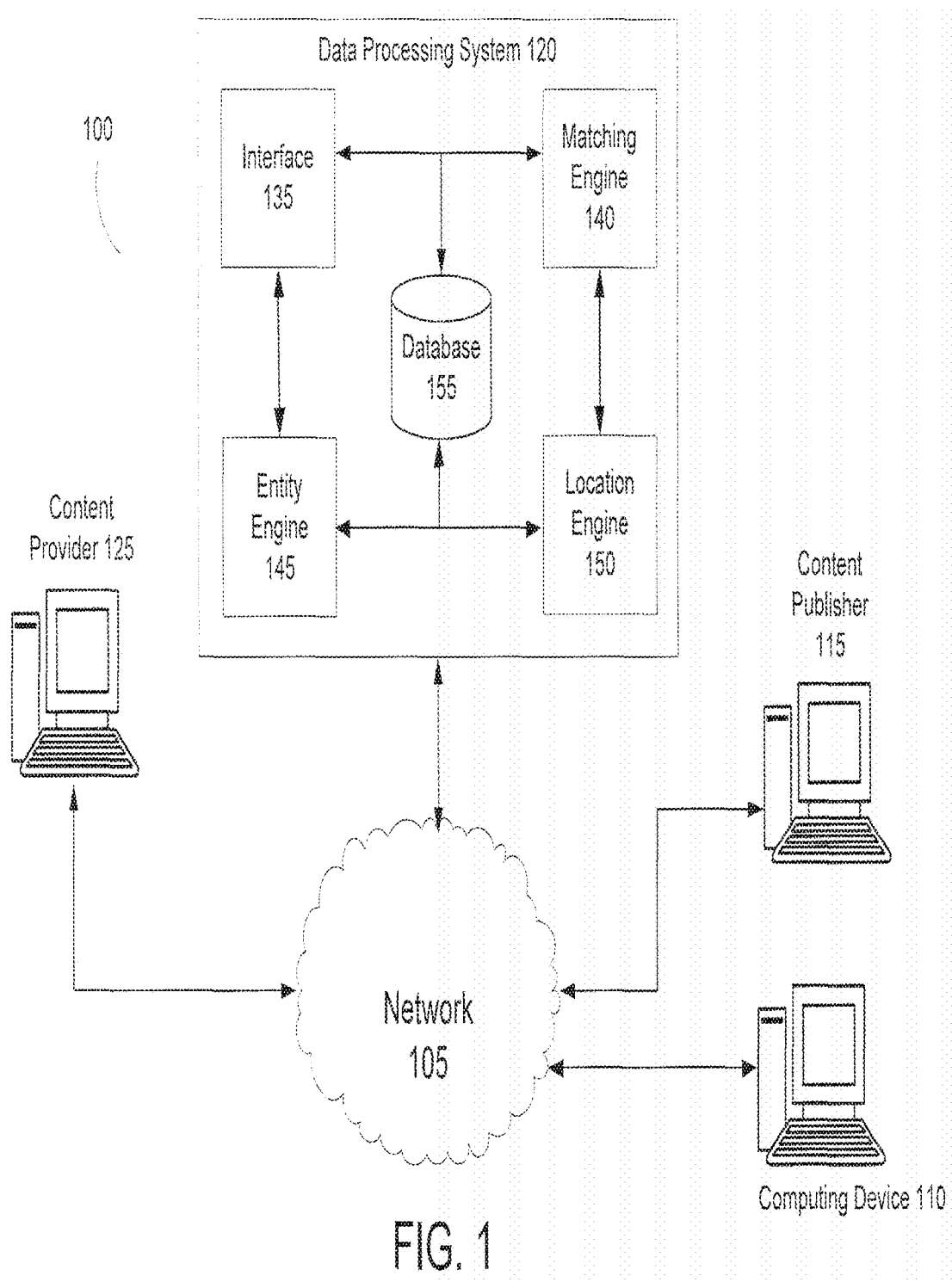
FIG. 1 is an illustration of a system for optimization of generation of a travel itinerary via a computer network in accordance with an implementation.

FIG. 1 illustrates an example system 100 for optimization of generation of a travel itinerary via a computer network such as network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be displayed on at least one computing device 110, such as a laptop, desktop, tablet, personal digital assistant, smart phone, or portable computers. For example, via the network 105 a user of the computing device 110 can access web pages provided by at least one web site operator or content publisher 115. In this example, a web user of the computing device 110 can access a web server of the web site operator or content publisher 115 to retrieve a web page for display on a monitor of the computing device 110. The web site operator or content publisher 115 generally includes an entity that operates the web page. In one implementation, the web site operator or content publisher 115 includes at least one web page server that communicates with the network 105 to make the web page available to the computing device 110.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("CMS") or universal mobile telecommunications system ("UNITS"). Different types of data may be transmitted via different protocols, or the same types of data may be transmitted via different protocols.

The system 100 can include at least one data processing system 120. The data processing system 120 can include at least one logic device such as a computing device having a processor to communicate via the network 105, for example with the computing device 110, the web site operator or content publisher 115, and at least one content provider 125. The data processing system 120 can include at least one server. For example, the data processing system 120 can include a plurality of servers located in at least one data center. The data processing system 120 can include multiple, logically-grouped servers and facilitate distributed computing techniques. The logical group of servers may be referred to as a server farm or a machine farm. The servers can also be geographically dispersed. A machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system ability, data sec the physical security of the system, and system performance by locating servers and high performance storage systems on localized high performance networks. Centralizing the servers and storage systems and coupling them with advanced system management tools allows more efficient use of server resources.

The data processing system 120 cart include a content placement system having at least one server. The data processing system 120 can also include at least one interface 135, at least one matching engine 140, at least location engine 150, at least one entity engine 145 and at least one database 155. The interface 135, matching engine 140, entity engine 145, and location engine 150 can each include at least one processing unit or other logic device such as programmable logic array engine, or module configured to communicate with the database 155. The interface 135, matching engine 140, entity engine 145, and location engine 150 can be separate components, a single component, or part of the data processing system 120. The system 100 and its components, such as a data processing system 120, may include hardware elements, such as one or more processors, logic devices, or circuits.

The data processing system 120 can obtain anonymous computer network activity infuriation associated with a plurality of computing devices 110. A user of a computing device 110 can affirmatively authorize the data processing, system 120 to obtain network activity information corresponding to the user's computing device 110. For example, the data processing system 120 can prompt the user of the computing device 110 for consent to obtain one or more types of network activity information, such as geographic location information. The identity of the user of the computing device 110 can remain anonymous and the computing device 110 may be associated with a unique identifier (e.g., a unique identifier for the user or the computing device provided by the data processing system 120 or a user of the computing device). The data processing system 120 can associate each observation with a corresponding unique identifier.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be treated in one or more ways before it is stored or used, so that certain information about the user is removed when generating parameters (e.g., demographic parameters). For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

The data processing system 120 can receive a request for content. The request may include a query such as a search query input into a search engine. The input query may include text, characters, symbols, etc. The data processing system 120 may receive the input query from a computing device 110 via network 105. In some implementations, the input query may include audio (e.g., words spoken by a user of the computing device 110 and input into the search engine of the data processing system 120 via network 105 and interface 135).

Responsive to the search query or other request for content, the data processing system 120 can identify, select or otherwise obtain content to be provided or presented via the computing device 110 making the request, or some other computing device 110 associated with the request for content. The content may include, e.g., text, characters, symbols, images, video, audio, or multimedia content. The request for content can include a request for an online advertisement, article, promotion, coupon, travel itinerary or product description. The data processing system 120 can receive the request from a computing device such as, e.g., computing device 110. For example, the data processing system 120 can receive the request via an application executing on the computing device 110, such as a mobile application executing on a mobile device (e.g., smart phone or tablet) may make a request for content. In some instances, a web page may request content from the data processing system 120 responsive to a user of a mobile device 110 visiting the web page (e.g., via a mobile device 110).

The request for content can include information that facilitates content selection. In some implementations, the data processing system 120 may request information from the computing device 110 to facilitate identifying content or content selection. The data processing system 120 may request or obtain information responsive to receiving a request for content from the computing device 110. The information may include information about displaying the content on the computing device 110 (e.g., a content slot size or position) or available resources of computing device 110 to display or otherwise manipulate the content.

The data processing system 120 can include an interface 135 designed and constructed to receive, access, obtain, transmit, convey or otherwise communicate with one or more component of the data processing system 120 or device (e.g., content provider 125, content publisher 115 and computing device 110) via network 105. In some implementations, the interface module 135 is configured to receive a search query provided via a user device 110. The search query may be input into a search engine of, associated with, or otherwise communicatively coupled to data processing system 120. The data processing system 120 can store the search query in a database 155 for later processing. In some implementations, the data processing system 120 provides or otherwise conveys the search query to the matching engine 140 for further processing. The interface module 135 can receive content selection criteria information from a content provider 125 and stores this information in a database 155 or otherwise transmits or conveys the information to one or more component of the data processing system 120 for further processing.

The interface 135 can be further designed and constructed to provide, generate, transfer or otherwise present a graphical user interface via the computing device 110, such as the graphical user interfaces illustrated in FIGS. 2A-2B.

The data processing system 120 can include a database 155. The database 155 can store information that facilitates optimizing generation of a travel itinerary. For example, the database 155 may be designed and constructed to store the information in one or more data structures in memory, storage, or a hard drive. The database 155 may be stored on the data processing system 120, or may be stored in another location, but be accessible to the data processing system 120 via network 105.

The data processing system 120 can store one or more database record that include a set of sequences generated from location data points. The location data points may have been received from multiple computing devices and processed or mined to generate sequences. These sequences may represent a trip and include location information and duration information. A first sequence of the set of sequences can identify a first duration that a subset of the multiple computing devices were at a first location, such as a number of days the subset of computing devices were in Rome. The first sequence can also identify a second duration that the subset of multiple computing devices were at a second location, such as the number of days the subset of computing devices were in Venice. The sequence may further indicate the order in which the duration and locations occurred by indicating that that the first duration or first location occurred prior to the second duration or second location.

In some implementations, the data processing system 120 can receive raw location data points or location history from multiple computing devices 110 to generate the set of sequences and store the set of sequences in the data record in the database 155. The interface 135 may be configured to receive the location data points from each of multiple computing devices and convey the location data points to an entity engine 145 or a location engine 150.

The data processing system 120 may include a location engine 150 designed and constructed to receive or determine location data of or associated with each of multiple computing devices 110. The location engine 150 may receive geo-location data points associated with a device 110. The data processing system 120 can receive the data points via a computer network 105 via a TCP/IP protocol, cell phone data network, or another communication protocol of computer network 105. The data points can include location information, or the data processing system 120 can determine the location information associated with a received data point upon receiving the data point from the device 110. The data processing system 120 can also receive an identifier associated with the data point, such as a unique device identifier, or a username associated with an application executing on the device 110. In one implementation, an application executing on the device 110 (e.g., a mobile application, a mobile operating system, a web browser, a map application, etc.) can transmit the geo-location data point that includes the location information, in one implementation, a mobile device 110 can periodically ping the data processing system 120 or other intermediate system to provide location or time information. In one implementation, a smartphone or other cellular enabled device 110 can ping a cell phone tower system, which may then provide location or time information to the data processing system 120.

To identify a location of the device 110, the data processing system 120 can request location or sensor data from the device 110. For example, the data processing may obtain a device 110 identifier to query a third party for location, such as a carrier or service provider associated with device 110 (e.g., a cell phone service provider or internet service provider). The device 110 may display a prompt or other notification responsive to the request for this information, to which a user of the device may grant or deny the request for information. The device 110 can also be configured to provide this information to the data processing system 120 (e.g., push location or sensor data, ping the data processing system 120). The location or sensor data may correspond to location or sensor information at or about the time of the request for content. The data processing system 120 may further receive sensor (e.g., accelerometer data, motion data, gyroscope data) and determine whether the device is stationary, walking, driving, on public transportation, etc. In this example, the data processing system 120 may determine that sensor data corresponds to a device activity of "walking".

The data processing system 120 can receive geo-location information, data points or pings responsive to search queries entered into a search engine or other input dialog box via the device 110. For example, the data processing system 120 can receive or determine geo-location information responsive to a request from a content publisher 115 or other web site operator. The data processing system can determine the geographic location in real time, or a predetermined time interval such as a periodic basis (e.g., 10 minutes, 5 minutes, 1 minute, 30 seconds, or another period that can facilitate the systems and methods disclosed herein). In one implementation, the device 110 pushes the data points to the data processing system 120 in real-time, periodic basis, or in a batch process. The device 110 that clicked on the content item can be different than the device 110 that provides the data points (e.g., a first user may use a desktop or laptop computer to click on the content item, and the first user or a second user different from the first user may use a mobile device or smart phone to provide data points). In some implementations, the device 110 used to click on the content item is the same as the device 110 used to generate, provide or transmit the data points.

The data points may include, or the data processing system 120 may determine, geographic location information of the geo-location data point based on, e.g., GPS, WI-FI, IP address, BLUETOOTH (e.g., a wireless technology standard for exchanging data over short distances using short-wavelength UHF radio waves from about 2.4 GHz to about 2.5 GHz, standardized as IEEE 802.15.1), near field communication ("NFC"), or cell tower triangulation techniques. In some implementations, the data processing system 120 may determine a latitude and longitude coordinate and identify a larger geographic area or cell comprising the latitude and longitude coordinate. The geographic location may correspond to a latitude or longitude coordinate, or the geographic location may correspond to a larger or smaller area, in some implementations.

In some implementations, the received data points may include, or the data processing 120 may determine, geographic location information including, e.g., latitude and longitude coordinates, geographic information system ("GIS") information, country, state, city, county, town, or precinct. The data processing system 120 may receive or otherwise identify geographic location information associated with the device 110 via an application programming interface ("API") that can provide scripted access to geographic location information associated with the device 110. In one implementation, the geographic API specification may include a specification associated with the WORLD WIDE WEB CONSORTIUM ("W3C"). In one implementation, a user of a device 110 proactively declares a location by checking-in to a location or otherwise declaring to an application executing on the device 110 or to the data processing system 120 that the user is at a location.

The geographic location of the device 110 can be determined via at least one of a global positioning system ("GPS"), cell tower triangulation, or WI-FI hotspots (wireless local area network based on a wireless standard such as IEEE 802.11). The data processing system 120 can identify or determine the technique used to determine a geographic location in order to determine an accuracy of the determined geo-location data point (e.g., OPS-based location information may be more accurate than IP-based location information). The data processing system 120 can also determine geographic location information based on an interaction with an information resource. In some implementations, the device 110 may include a global positioning system ("GPS"). For example, the data processing system 120 may determine a geographic location based on an internet protocol ("IP") address. In one implementation, the device 110 includes a GPS sensor or antenna and be configured to determine a GPS location of the device 110. The data processing system 120 can also determine the geographic location by using information obtained from one or more cell towers to triangulate the location of the device 110. In one implementation, the geographic location determined based on information received from one cell tower, two cell towers or three cell towers may be sufficient for content selection. In some implementations, WI-FI hotspots may facilitate determining a geographic location because WI-FI hotspots may be stationary and can be used as a landmark. In one implementation, the relation of a device 110 with respect to a WI-FI hotspot can facilitate determining a geographic location of the device 110.

The data processing system 120 may include an entity engine 145 designed and constructed to receive a location data point and identify, determine, or annotate the location data point with an entity. In some instances, the location engine 150 may forward or transmit the location data points to the entity engine 145 for further processing, while in other instances the entity engine 145 may receive the location data points from the multiple computing devices.

An entity may be a town, city, state, country, geographic region, or other place or thing. Entities may be associated with a unique identifier. The entity engine 145 may access a repository that can include millions of entities that each have a unique identifier to distinguish among multiple entities with similar names. The entity repository or database may include travel entities, which may be a subset of all known entities (e.g., single person, place, thing or topic). The travel entities may be annotated with travel-specific information. One such source may be a manually created taxonomy of entities such as an entity graph of people, places, properties, and things, built by a community of users.

A unique identifier ("ID") may be a combination of characters, text, umbers, or symbols. The data processing system may obtain the classification from an internal or third-party database via network 105. In one implementation, the entities may be manually classified by users of a user device 110. In some implementations, users may access the database of via network 105. Users may upload at least one entity or upload multiple entities in a bulk upload. Users may classify the uploaded entities, or the upload may include the classification of at least one entity. In some implementations, upon receiving an entity, the data processing system 120 may prompt the user for a classification.

Classifications may indicate the manner in which entities are categorized or structured, e.g., ontology. The entities can be categorized or structured via the data processing system 120 or via crowd sourcing techniques. An ontological classification may include attributes, aspects, properties, features, characteristics, or parameters that entities can have. Ontological classifications may also include classes, sets, collections, concepts, or types. For example, an ontology of "Eiffel Tower" may include: country—France; city—Paris; type—historical monument; material—iron; architect—Gustave Eiffel, etc. in some implementations, the manual classification includes structured data that provides a manually created taxonomy of entities. In some implementations, entities may be associated with an entity type, such as people, places, books, or films. In some implementations, entity types may include additional properties, such as date of birth for a person or latitude and longitude for a location. Using the data processing system 120 or crowd sourcing techniques, entities may also be associated with domains, such as a collection of types that share a namespace, which includes a directory of uniquely named objects (e.g., domain names on the internet, paths in a uniform resource locator, or directors in a computer file system). Entities may also include metadata that describes properties (or paths formed through the use of multiple properties) in terms of general relationships.

Entities may be classified, at least in part, by one or more humans ("entity contributors"). This may be referred to as manual classification. In some implementations, entities may be classified using crowd sourcing processes. Crowd sourcing may occur online or offline and may refer to a process that involves outsourcing tasks to a defined group of people, distributed group of people, or undefined group of people. Users may add, modify, or delete classifications online. An illustrative implementation of offline crowd sourcing may include assigning the task of uploading or classifying entities to an undefined public not using the network 105, e.g., to students in a classroom or passersby on the street or at a mall.

In some implementations, data processing system 120 may obtain or gain access to the classification of a plurality entities from content repository 155 (e.g., a database) or another database accessible via network 105. In some implementations, entities may be stored in a graph database where the entity data structure includes as a set of nodes and a set of links that establish relationships between the nodes. The entity data structure in the graph database may be non-hierarchical, which may facilitate modeling complex relationships between individual elements, and allow entity contributors to enter new objects and relationships into the underlying graph structure. The entity engine 145 may annotate the location data points with travel entities. Travel entities may include those entities that are determined to relate to travel or trips or tourism. Travel entities may include geographic regions (e.g., cities, towns, states, countries), destinations, tourist sites, historical sites, landmarks, restaurants, natural wonders, etc.

The data processing system 120 can identify an entity of a location data point received from a computing device 110. In some implementations, the data processing system 120 identifies an entity of a query provided by a computing device 110 (e.g., input into a search engine). The entity engine 145 may identify zero, one or many entities in or associated with the search query. The data processing system 120 may map terms, keywords, phrases, or locations in the location data points or the search query to one or more well defined entities in a database.

The identified entities can include additional information about the classification (e.g., metadata). In some implementations, the additional information may include a domain, type, property, or description. In some implementation, the entity includes a unique identifier that indicates a classification of the entity. The additional information may be inferred via the unique identifier of the entity. For example, an entity may be French, with a unique identifier "/dining/cuisine". The unique identifier "Mining/cuisine" may include properties such as description, region of origin, restaurants, ingredients, dishes, or chefs.

The data processing system 120 can obtain some or all of the additional information associated with the entity and annotate, decorate or otherwise associate that information with the entity. The additional information may be linked to the entity, where the link includes a relationship. In an illustrative implementation, if the entity is "Eiffel Tower", the data processing system 120 can annotate the entity with the following properties: located in Paris, France; historic site; tourist attraction, etc. Thus, in one implementation, the entity engine 145 analyzes a location data point received from a computing device (or location information provided by a computing device) and annotates the location data point with an entity. The entity engine 145 may further annotate the location data point with additional information associated with the entity that may be retrieved from an entity repository. In some cases, the data processing system 120 annotates a plurality of location data points with entities, such as in an offline process.

In some implementations, the data processing system 120 (e.g., via the location engine 150 or the entity engine 145) associates a location data point with a cell covering a corresponding geographic region. The cell can represent a geographic cell, tile, or other region. The cell can have any granularity or resolution. The cells may have fixed dimensions or a range of dimensions such as 100 meters to 5 kilometers. The cell may have a fixed width of 1 kilometer, 500 meters, 1.5 kilometers, etc. The data processing system 120 can generate the cell using a cell generation technique. In some cases, the data processing system 120 generates the cell using a cube and quadtree projection of the Earth's surface. This may allow a coordinate system with cells to map onto a real surface area of the Earth.

Upon receiving a location data point, the data processing system 120 can associate the location data point with a corresponding cell. The data processing system 120 (e.g., via the location engine 150 or entity engine 145) can determine a latitude and longitude coordinate of the location data point, and identify a corresponding cell that includes the latitude and longitude coordinate of the location data point. Since a cell may encompass a larger geographic region, multiple location data points may fall within a single cell.

The entity engine 145 may annotate the cells with entities. A cell may include me or more entities, such as a cell that includes entity San Francisco and entity California. In some instances, the entity engine 145 may annotate the cells with only travel entities (e.g., an absence of non-travel entities such as a person).

Thus, the data processing system 120 can obtain multiple location data points from a computing device, associate the received multiple location data points with one or more cells, and annotate the cells with travel entities. Using the location data point, the data processing system 120 may estimate or determine an amount of time spent at each entity (e.g., using latitude and longitude points and corresponding timestamps).

In some instances, the received location data points from a computing device may provide a sparse sequence of observations. Each observation may include a timestamp, a latitude and longitude, and possibly a mode (e.g., driving, walking, still). In these cases, the data processing system 120 can smear or otherwise process these observations to estimate a duration a computing device spent in a geographic region or cell or travel entity. The data processing system 120 may employ one or more smearing techniques. In some implementations, the data processing system can perform a simple smearing technique by taking a midpoint in time between observations to estimate a duration. This would allow the data processing system 120 to assign latitude/longitude bins into cells with a fixed granularity.

Figure 4:
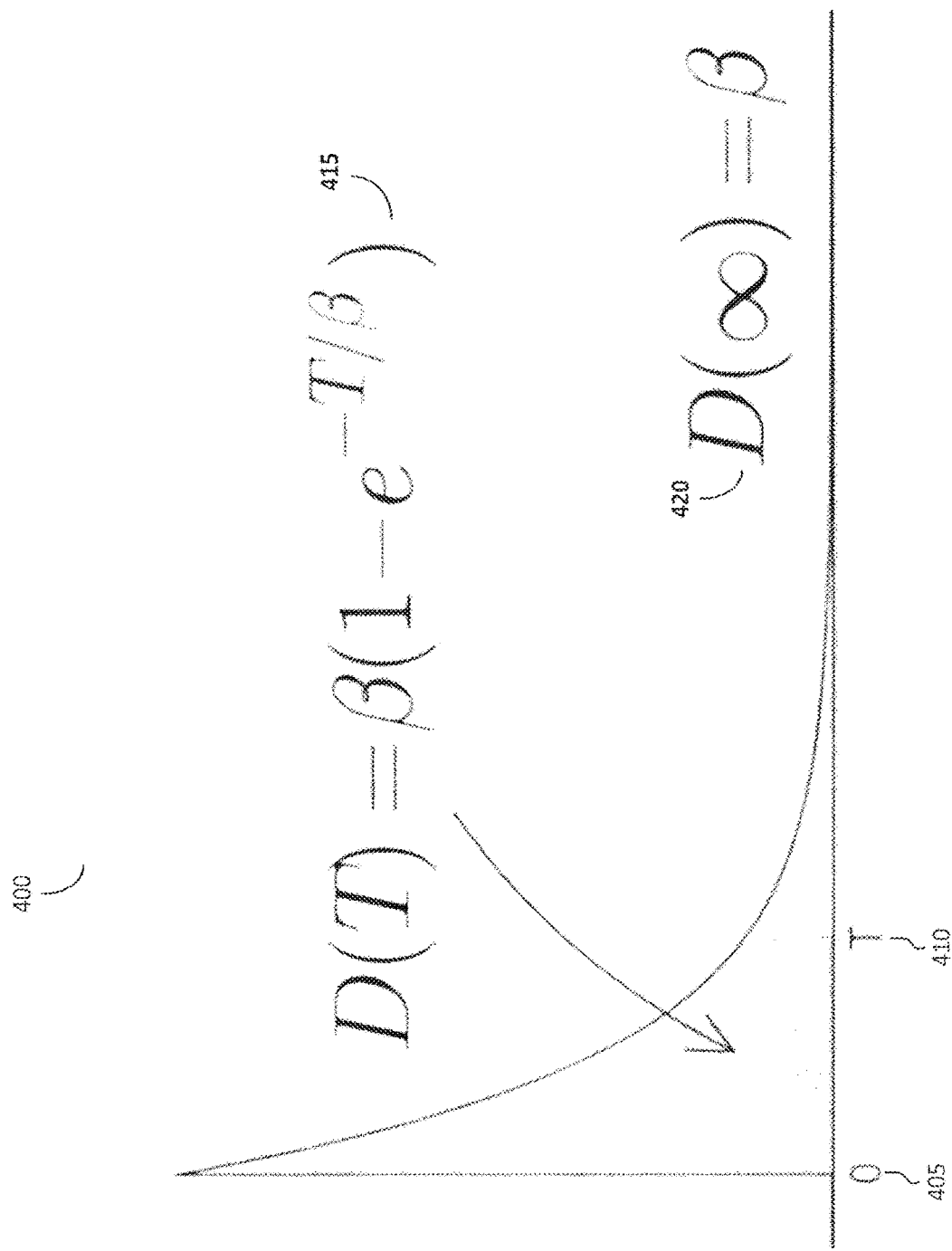
FIG. 4 is an illustration of determining a duration attributed to a cell in accordance with an implementation.

In some implementations, the data processing system 120 may employ or be configured with a multiscale smearing technique that that smears observations in time and space. Thus, given an observation and a region, the data processing system may model the likelihood over time that the computing device leaves that region, cell or entity (e.g., as illustrated by graph 400 shown in FIG. 4). The data processing system 120 can model how fast the likelihood of the computing device remaining in a cell drops off with time. The area under a curve generated by the equation used to model the likelihood may provide an estimate for the duration spent in the region, given only a single observation or few observation points. To improve the efficiency of the computation, the data processing system 120 can be configured with an equation with a closed form solution for the area under the curve.

In an illustrative implementation, the data processing system 120 (e.g., the location engine 150) can be configured with the following equation to determine or estimate a duration a computing device stays in a cell, entity, or region:

$$D(t) = \beta_l \left(1 - e^{-\frac{t}{\beta_l}}\right) \qquad \text{Equation 1}$$

Figure 6:
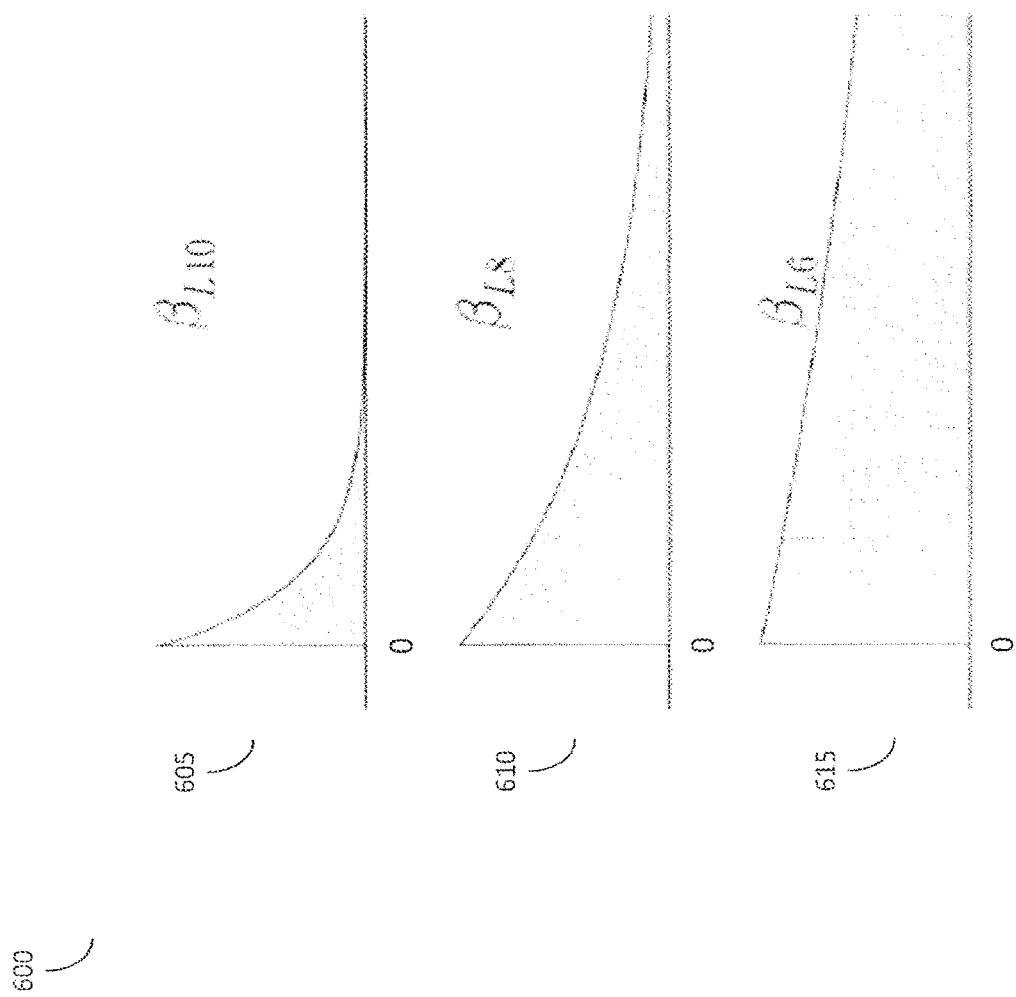
FIG. 6 is an illustration of determining scale and activity in accordance with an implementation.

In Equation 1, D(t) represents the duration or stay time that can be attributed to a cell or entity after t seconds have elapsed from the observation time (e.g., timestamp of the location data point or time the location data point was received), where $D(\infty)=\beta_l$. The term β may be a parameter whose value is chosen based on the size of the region or cell and an estimate mode of the associated observation. In an illustrative implementation, if the region or cell has a diameter of 10 meters, and the mode is still (as opposed to driving or walking), then the value for β would provide a slow drop off, as illustrated in graph 615 of FIG. 6. In another illustrative implementation, if the region or cell has a diameter of 10 meters and the mode is driving, then the value of β would be chosen to provide a fast drop off, as shown in graph 605 of FIG. 6. Graph 610 of FIG. 6 provides yet another value of β that provides a medium drop off (e.g., a mode of walking with cell size 10 meters). In some implementations, the data processing system 120 can utilize a heuristic technique to select the values for parameter β. The heuristic technique may take into account or be based on the size of the cell (e.g., ranging from 10 meters to 50 meters or 100 meters or 1 kilometer, etc.) and the mode of the observation (e.g., driving, walking, still, flying, biking, train).

This equation is based on modeling the waiting time until the computing device transitions out of the cell of level l as a random variable with a probability density function given by Equation 2. The level l may refer to a size of the cell or level. Each level may correspond to a size (e.g., level 20 may correspond to a cell with a side of approximately 10 meters; level 13 may correspond to a cell of size 1 kilometer; level 6 may correspond to a cell with a side of approximately 150 kilometers). The data processing system 120 may be configured with several levels, e.g., ranging from level 1 to 20. In some implementations, the data processing system 120 may select a subset of levels to use for processing, such as levels 6 to 20 to provide a certain level of granularity while improving efficiency.

$$f(x) = \frac{e^{-x/\beta_l}}{\beta_l} \qquad \text{Equation 2}$$

The data processing system 120 can employ Equation 1 when processing location-history data obtained from computing devices. In some implementations, the location-history data for a computing device may be stored as a sequence of observations, where each observation may include a time stamp and latitude and longitude (e.g., $\{O_1, \ldots O_N\}$ at timestamps $\{t_1, \ldots t_N\}$). Except for a last observation in the sequence, the duration over which the data processing system 120 estimates an observation $O_i$'s contribution to a cell is bounded by the arrival of a next observation $O_{i+1}$. Thus, within a time interval $t=t_{i+1}-t_i$, multiple possibilities exist for the occurrence of an event (e.g., the computing, device or user leaving the cell). A first possibility may include the computing device is still in the cell after duration t. In this case, regardless of the actual time T≥t the computing device would have transitioned, the data processing system 120 may apportion a duration of t to the cell, since the data processing system 120 is concerned with the fraction of $t=t_{i+1}-t_i$ for which the computing device existed in the cell.

In a second possibility, the computing device may have transitioned out of the cell after a waiting time of T<t. In this case, the data processing system 120 may determine the actual time spent in the cell and assign this duration to the cell.

Figure 5:
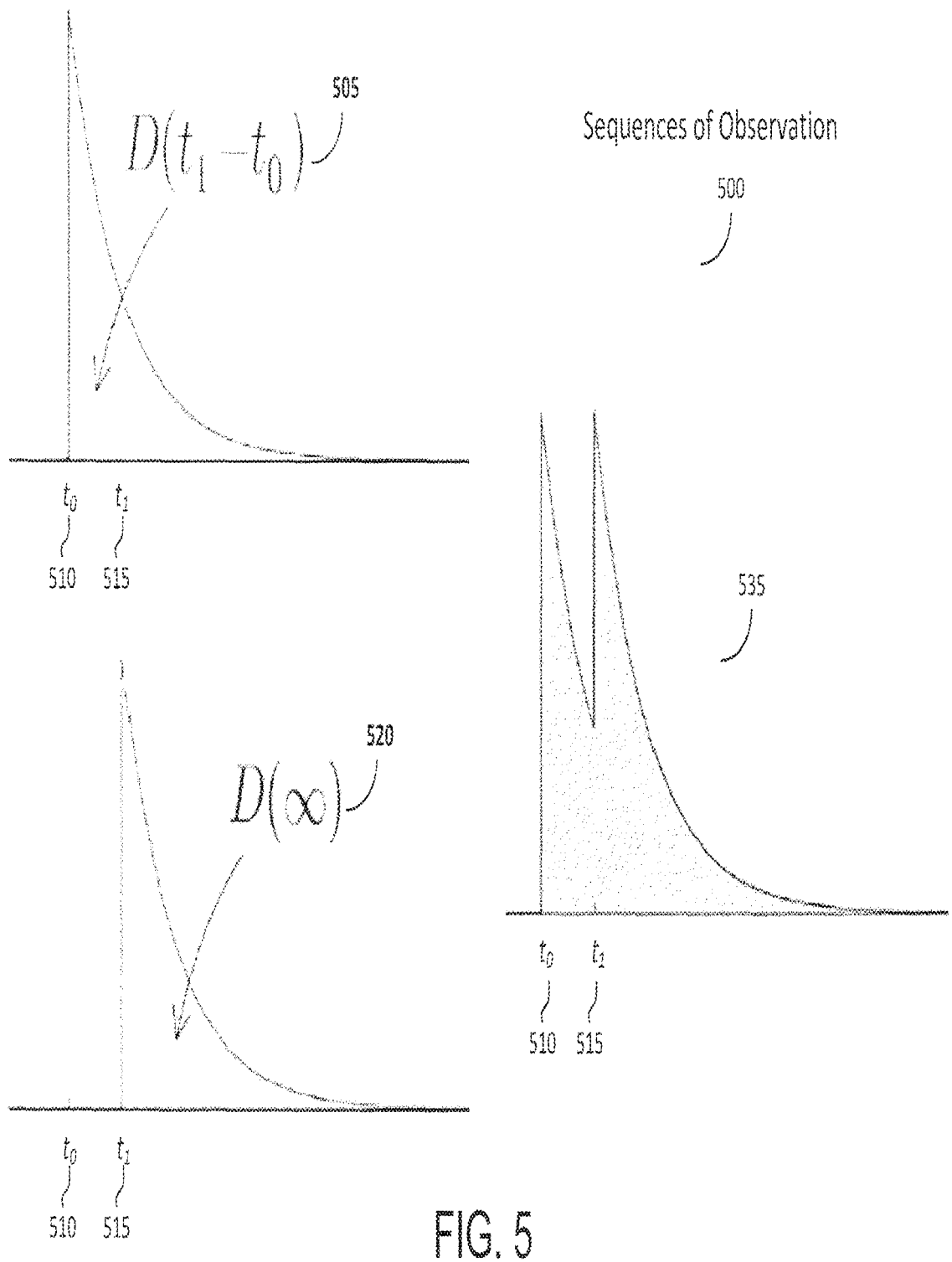
FIG. 5 is an illustration of determining sequences of observations in accordance with an implementation.

As the data processing system 120 receives additional observations in a same region or cell, the data processing system 120 can truncate the curve from the previous observation and add together the estimated durations. The graphs 505, 520 and 535 illustrated in FIG. 5 provide an illustration of combining sequences of observations. As shown in graph 505, the first and second observations are t0 (510) and t1 (515). Based on these observations, the duration is computed as the area under the curve D(t1-t0) 505. The final observation shown in graph 520 represent the duration at time infinity since this is when an event such as transitioning out of the cell occurred. By combining the sequence of observations, as illustrated in graph 535, the system can determine a smeared duration for the cell as the area under the combined curve 535.

In some implementations, the data processing system 120 (e.g., via the entity engine 145) can annotate the cells with entities after durations are estimated for the cells. In some implementations, the data processing system 120 can obtain a set of candidate entities that overlap with a union of the top level/cells to which smeared duration was aggregated. Given the coarseness the top level/cells, this may over-retrieve some entities, but this can be accounted for by further processing. For example, the data processing system 120 may start with estimated durations within coarser cells, and annotate cells with entities by recursively descending the smeared cell hierarchy and checking for containment with an entity's cell covering. The recursion may end with a cell is either completely contained (e.g., the smeared time may be attributed to the entity) or completely disjoint. Partial containment may cause the recursion down to child-cells at the next level.

FIG. 7 illustrates converting the cells to entities in accordance with an implementation. The first map 705 illustrates a first coarse cell 710 around Seattle, Wash. and a second coarse cell 715 around San Francisco, Calif. A cell may be a coarse cell based on the size, granularity, or area of the cell (e.g., 10 km$^2$, 20 km$^2$, 30 km$^2$, 50 km$^2$). The data processing system 120 may select the coarse cell 715 to convert to entities as shown in map 720 containing entities 725a-q. Each entity cell 725a-q may be represent a different entity with a corresponding duration and travel entity information. The result of smearing a sequence of observations can be visualized as a forest of non-overlapping cell trees, each rooted at an l-level cell. The root level may refer to the lowest or most granular level cell, or may be set by a configuration file of or associated with the data processing system 120. Each node in the tree can include a smeared duration aggregated at that level by observations that fall within that cell's region. The structure may summarize durations spent within regions at various levels, and can be used as an input to various algorithms, engines or modules of the data processing system (such as trip detection, base detection, entity-annotation).

Using the cells annotated with entities and attributed with durations, the data processing system 120 can aggregate statistics for trips. In some implementations, the data processing system 120 first separates trips from base locations (e.g., home or work locations) in order to aggregate statistics for trips as opposed to base locations. To identify trips, the data processing system 120 may apply a threshold (e.g., a trip threshold) to cells. The data processing system 120 may identify cells where a computing device spent a percentage of time (or duration) greater than or equal to a threshold (e.g., 10%, 15%, 20%; threshold may range from 5% to 40% in any increment), where the duration is estimated using a smearing technique. The cells that satisfy the threshold may be represent a base location (e.g., home location or work location).

The data processing system 120 may detect a trip by identifying an observation that is greater than or equal to a distance threshold from a base location. The distance threshold may range from about 100 kilometers to 250 kilometers. For example, the distance threshold may be 200 kilometers. In some implementations, the data processing system 120 may detect a trip when an observation is identified greater than or equal to 200 kilometers from the base location where the computing device spends more than 10% of its time.

After a trip is triggered by the observation, the data processing system 120 can include adjacent observations greater than a second threshold from the base location. For example, a trip may be triggered by an observation greater than or equal to 200 km from the base location, and the data processing system 120 may include adjacent observations greater than or equal to 100 km from the base location. The data processing system 120 may further discard trip that are less than or equal to a duration threshold (e.g., about 2 to about 10 hours, 4 hours, 5 hours, 2 hours, etc.). By discarding the trips having a relatively short duration such as 4 hours, the data processing system 120 can reduce or eliminate noise.

In some implementations, the data processing system 120 may identify trips, and then determine a smeared duration and attribute entities only for detected trips. For example, given a detected trip, the data processing system 120 determines the amount of time spent at location-entities (e.g., cities, countries) while on that trip. The data processing system 120 may apply multiscale smearing over a trip to turn individual data points or observations into durations. The data processing system 120 may then determine a duration for an entity by aggregating the durations in a cell. This may provide an estimate for a duration spent at an entity by a computing device 110. The data processing system 120 can generate or determine estimates for durations at one or more levels of granularity, which may be determined by the data processing system 120 based on various parameters associated with the observation (e.g., mode, cell size, etc.).

The data processing system 120 can determine a duration a computing device was at an entity. For example, the data processing system 120 may analyze a plurality of location data points, detect a trip, identify the location data points (or observations) associated with trips, attribute a duration to the observations or location data points, identify cells corresponding to the observations, and annotate the cells with entities. In some cases, the cells may be broken down such that each cell is a different entity (e.g., entities do not overlap multiple cells). In some instances, multiple cells may include the same entity. For example, the entity California may include multiple cells, as illustrated in FIG. 7. To determine a duration a computing device spent in California, the data processing system 120 may then add, sum, or otherwise combine the durations of each of the cells 725a-q corresponding to the entity California to identify a total duration the computing device spent in California.

In some implementations, the data processing system 120 can store the detected trips into a data record or database. The detected trips may include a sequence of entities and a duration a computing device stayed at each entity in the sequence. The data processing system 120 may determine the duration using a smearing technique. The data processing system 120 may determine the start and end point of the trips based on distance thresholds (e.g., distance between an observation and the determined base location, and distance between additional observations and the observations that triggered the trip).

In some implementations, the data processing system 120 (e.g., via the entity engine 145 or location engine 150) may aggregate statistics. The data processing system 120 may aggregate statistics for detected trips or base locations. The data processing system 120 may aggregate statistics among a plurality of computing devices. The statistics may include or relate to, e.g., duration, locations, mode, or a base location. The data processing system 120 may aggregate statistics to identify, for example, the most popular destinations, most popular durations, or the most popular modes.

The data processing system 120 may identify median statistics to identity the most popular destinations, durations or modes.

In some instances, the data processing system 120 can aggregate statistics based on a criteria. For example, the data processing system 120 may identify the most popular destinations within Italy. In another example, the data processing system 120 may identify the most popular duration people stay in Paris. In some implementations, the data processing system 120 can use additional criteria such as a base location. For example, the data processing system 120 may analyze the sequences of detected trips stored in a data record or database to identify the entity Paris, and then identify the most common duration associated with Paris. The data processing system 120 may rank all the durations and then compute or determine the median duration. The data processing system 120 may set the granularity of the duration to be to the nearest day, or half day, 6 hours, or some other time interval for the purposes of aggregating statistics or storing in the data record.

Figure 8:
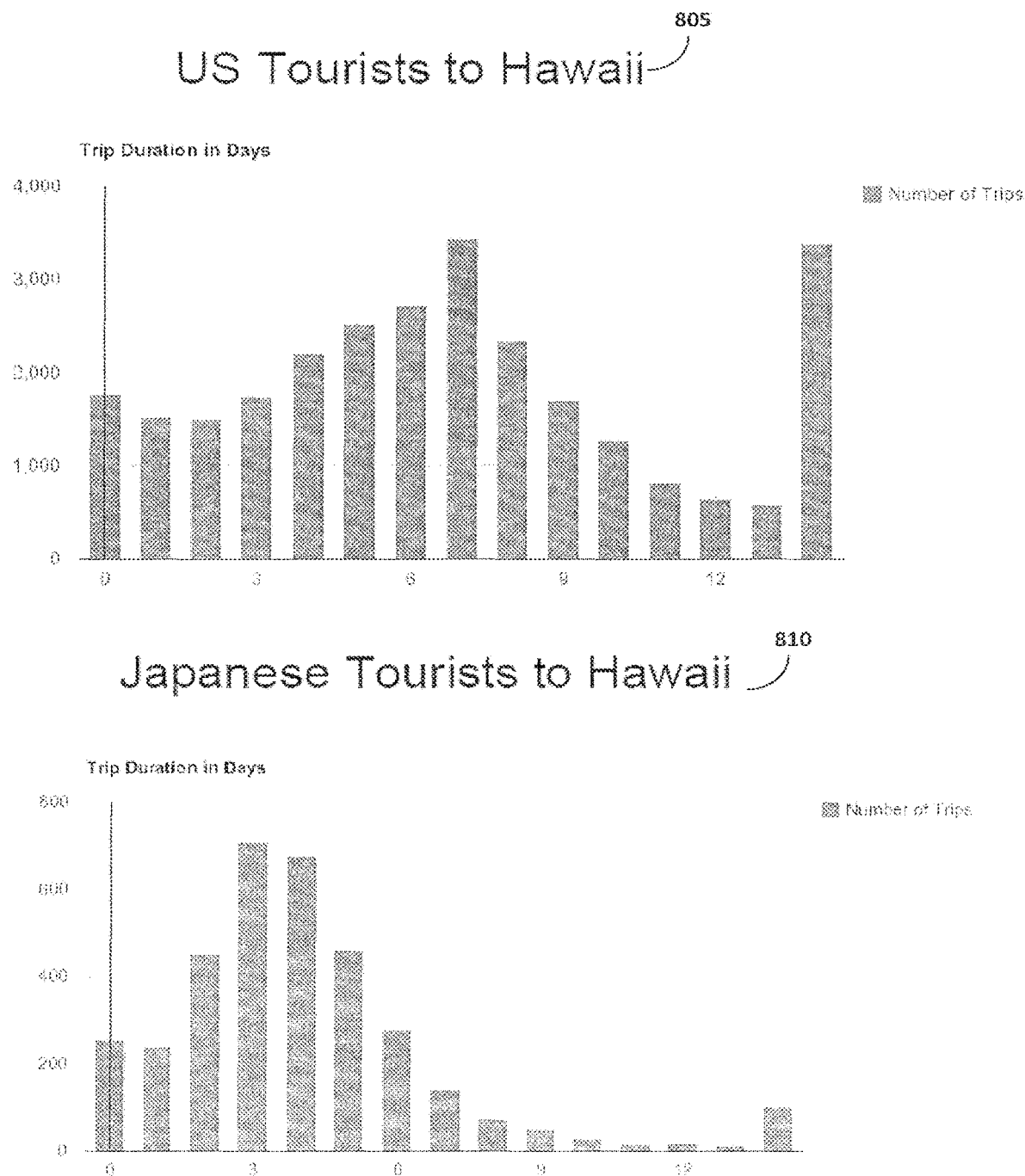
FIG. 8 is an illustration travel statistics determined by the system in accordance with an implementation.

FIG. 8 illustrates aggregated statistics from detected trips in accordance with an implementation. Graph 805 illustrates aggregated statistics for computing devices with a base location that traveled to Hawaii. The base location may represent an attribute of the computing device. The X-axis shows the trip duration in days, and the Y-axis shows the number of trips that correspond to the duration on the X-axis. As shown here, the duration granularity is days (as opposed to a liner granularity of hours). For example, there were approximately 3,500 trips to Hawaii with a duration of 7 days. This is the most common duration for trip to Hawaii by computing devices with base locations in the United States. The second most common duration was 14 days, with about 3,250 trips. The least common duration was 13 days, with about 500 trips. Graph 810 shows similar aggregated statistics, but for computing devices with Japan as their base location. In this case, the most common duration was 3 days with about 700 trips. The second most common duration was 4 days with about 650 trips. The least common duration was 13 days. However, 7 day duration for computing devices with a base location of Japan was relatively unpopular, while this same duration for computing devices with a United States base location was the most popular duration. Thus, aggregating statistics based on a criteria such as an attribute of the base location may facilitate optimizing generation of a travel itinerary for a computing device.

Figure 9:
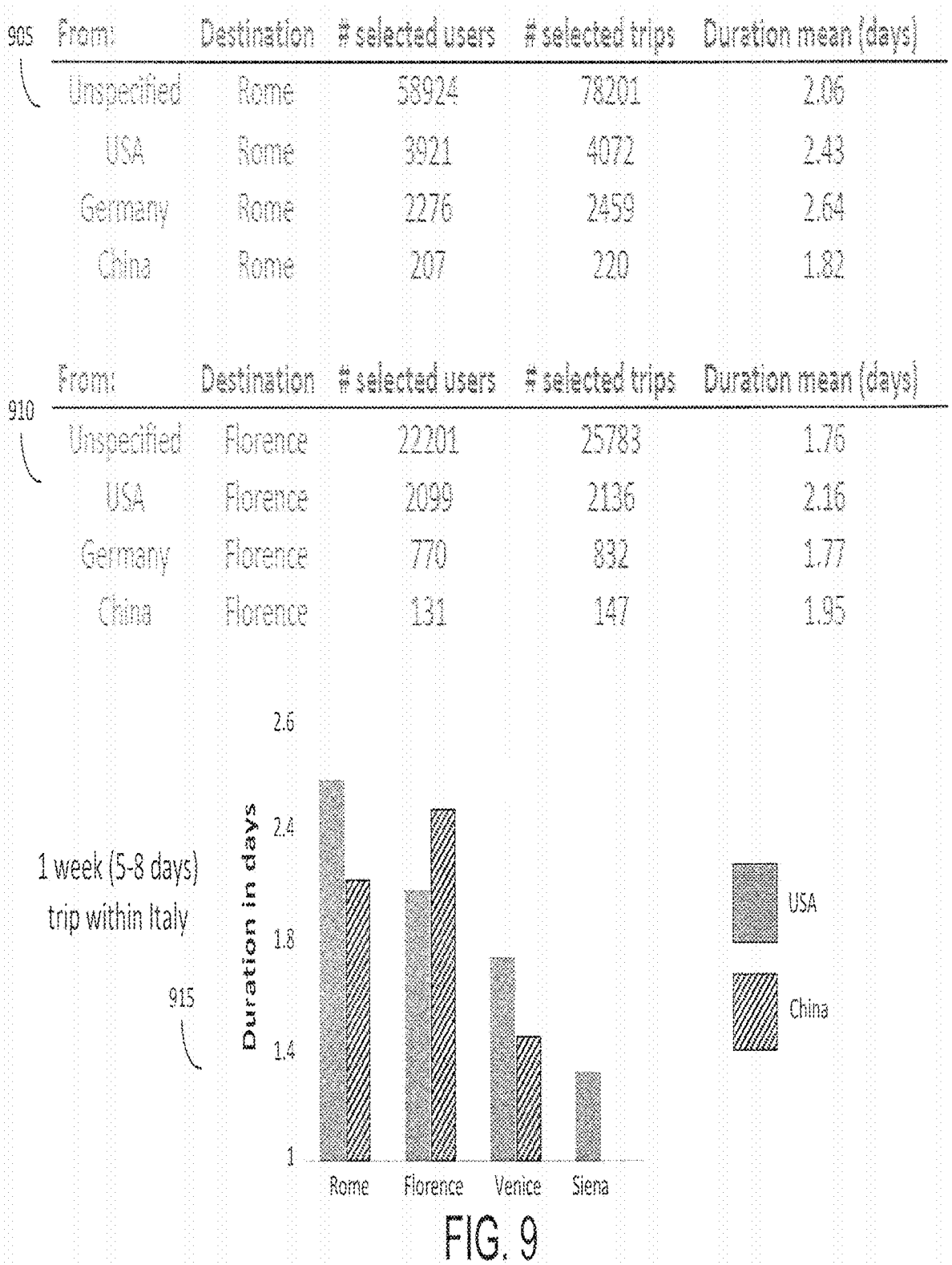
FIG. 9 is art illustration of entity statistics determined by the system in accordance with an implementation.

FIG. 9 is another illustration of entity statistics determined by the system in accordance with an implementation. In table 905, the data processing system 120 shows base locations tinder the "From:" heading as "Unspecified, USA, Germany, and China". In this example, all the destinations arc Rome. The table further shows the number of selected users, the number of selected trips, and the mean duration in days. The data processing system 120 may show other statistics such as a median duration, and provide additional statistical information such as a standard deviation or variance, and may include other units such as hours or weeks. For example, computing devices with a base location of USA on average stayed in Rome for 2.43 days, whereas computing devices with a base location of China on average stayed in Rome for 1.82 days. Table 910 is similar to table 905, but for a different destination—Florence. The graph 915 illustrates some of the information from table 905 and 910 by showing in a graphical form the duration in days for destinations Rome, Florence, Venice and Siena corresponding to computing devices with base locations of USA and China.

The data processing system 120 may include a matching engine 140 designed and constructed to receive a request for a location sequence, identify an attribute of the computing device making the request, and select the location sequence from a set of sequences. The matching engine 140 may include or be configured with a matching module. The request for a location sequence may be provided in various forms. In some cases, a computing device 110, or user thereof, may input a query into a search engine or other input text box such as "Italy for 7 days". The data processing system 120, upon receiving that query, may determine that the query is or corresponds to a request for a location sequence or a request for a travel itinerary or similar content. The data processing system 120, in some implementations, may provide the query to the matching engine 140 to select a location sequence responsive to the query.

To identify or generate one or more sequences responsive to the query, the matching engine 140 may identify an attribute of the computing device that entered the query into the search engine. The attribute may include, e.g., a base location of the computing device, a current location of the computing device, a mode (e.g., walking, driving, still) or any combination thereof. The matching engine 140 may identify the aggregated statistics corresponding to the attribute. For example, for the query "Italy for 7 days", the matching engine 140 may identify the base location and then identify a set of sequences with the same base location of the computing device that input the query and that correspond to a 7 day trip in Italy.

The data processing system 120 can (e.g., via the matching engine 140) use the constraint "Italy for 7 days", which includes a temporal constraint and a destination, to mine the detected trips to identify popular itineraries that satisfy the constraints. The data processing system 120 can generate candidate itineraries by analyzing detected trips that satisfy the constraints, and find frequently co-occurring, non-trivial sets and sequences of destinations (or entities), with associated visit durations. The matching engine 140 may be configured with frequent itemset mining techniques or association rules that allow the matching engine 140 to identify and select an itinerary example, using a frequent itemset mining technique, the matching engine 140 can generate candidate itineraries and then use techniques such as expectation-maximization to score and rank the candidate itineraries or to estimate durations for the candidate itineraries. The generated itineraries can be scored and ranked by order from best to worst, and an estimate recommended visit duration for each entity in each itinerary can be determined.

To generate candidate itineraries, the matching engine 140 can first collect detected trips across users that match the query constraints. For each matching trip, the data processing system 120 can maintain entities that correspond to travel entities (e.g., entities that match a repository of travel itineraries). The data processing system 120 may also filter out or remove "transient" entities, with smeared duration of less than a time interval such as, e.g., 4 hours. The time interval can be any time interval that falls within a time interval range. In an illustrative, non-limiting, implementation the time interval range can be about 1 hour to about 10 hours. This produces the set of meaningful destinations visited on each trip, with associated smeared durations. Next, the data processing system 120 identifies frequently co-occurring, nontrivial sets of entities across trips. The data processing system 120 can use a frequent itemset ruining library to efficiently find nontrivial subsets of destinations that appear in at least a minimum number of trips ("N") trips (e.g., 50 trips). The frequent itemset mining library can include or employ a frequent pattern tree structure that can be an extended prefix-tree structure that stores compressed, relatively important information about frequent patterns. The frequent itemset mining technique can include or be based on compressing a large database into a condensed, smaller data structure; using a pattern fragment growth method that avoids the generation of a large number of candidate sets; and a partitioning-based, divide-and-conquer method to decompose the mining task into a set of smaller tasks for mining confined patterns in conditional databases.

After the data processing system 120 finds the nontrivial sets of entities, the data processing system 120 can use the sets of entities to generate a possible or candidate itinerary. The set of entities produced by frequent itemset mining may be unordered sets, rather than sequences. For example, a trip that visited Rome and then Florence, and another trip that visited Florence then Rome would both contribute to the <Florence, Rome> entity set. Thus, the data processing system 120 can identify unordered co-occurrences during a phase of candidate generation. In an illustrative example shown in Table 1, the most frequently co-occurring entity sets mined from trips matching the query "Italy for at least 7 days" may include:

TABLE 1

Frequent location sets:

| Location Sequence | # of Entities | Frequency |
| --- | --- | --- |
| Florence, Tuscany | 2 | 4923 |
| Rome, Tuscany | 2 | 4127 |
| Florence, Rome | 2 | 3266 |
| Milan, Lombardy | 2 | 3169 |

The matching engine 140 may further rank itineraries and estimate durations to choose a popular, representative subset of the candidate itineraries to show, and estimate the duration associated with each destination in a candidate itinerary. To do this, the matching engine 140 can use techniques in addition to frequent itemset mining. In an illustrative example, the input trips may include:

T1: Rome (4d), Florence (3d)
T2: Rome (2d), Florence (2d), Venice (3d)
T3: Rome (2.5d), Florence (2.5d), Venice (2d)
T4: Rome (3d), Florence (4d)
T5: Rome (2d), Florence (2d), Venice (3d)

From this input, the matching engine 140 may produce the following candidate itineraries using frequent itemset mining:

I1: Rome (??d), Florence (??d)
I2: Rome (??d), Florence (??d), Venice (??d)

Here, the "??d" indicates that a duration at each entity is yet to be determined. Frequent itemset mining may assign I1 a frequency of 5, because it appears in all 5 trips, whereas I2 would be given a frequency of 3. However, the itinerary containing Venice may actually be more popular. In some cases, the data processing system 120 may compute the median durations for these itineraries using this definition of "contributing trip" as follows:

I1: Rome (2.5d), Florence (2.5d)
I2: Rome (2d), Florence (2d), Venice (3d)

In some implementations, the data processing system 120 may use another technique to estimate the durations by taking into account how well the itinerary explains each trip (e.g., by applying an expectation maximization technique to the unordered sets of entities). The data processing system 120 can assign each trip to the candidate itinerary which best explains it. The data processing system 120 can then measure popularity and estimate duration parameters using these assignments.

The matching engine 140 can use additional scoring techniques to map an actual trip to an itinerary. In order to identify the most popular itinerary, the matching engine 140 assigns actual trips to candidate itineraries that best explains them by comparing an actual trip of a computing device with the candidate itinerary. To determine similarity between the actual trip and the candidate itinerary, the matching engine 140 may employ a Jaccard similarity technique. For example, if an actual trip T includes a set of entities $\{e\}$, each associated with a duration $d_e$, then the similarity between the actual trip T and a candidate itinerary I may be determined as follows:

$$J(T,I) = (\Sigma_{e \in I} d_e) / (\Sigma_{e \in T} d_e) \qquad \text{Equation 3:}$$

The numerator is the intersection between the sets of entities T and I, and the denominator is the union, in both cases weighted by the trip's entity durations. The similarity may be zero ("0") when the entities in the itinerary are not a subset of the entities in the trip. Thus, the candidate itineraries that are selected may correspond to real trips that were taken by computing devices. The matching engine 140 can use the Jaccard similarity to assign each trip to the candidate itinerary that best explains it, or can skip/ignore trips that do not sufficiently match itineraries, e.g., based on a threshold of similarity (similarity threshold). The similarity threshold may be a non-zero number that facilitates identifying trips that sufficiently match a candidate itinerary, while removing trips that do not sufficiently match a candidate itinerary. The data processing system 120 may not use the trips that do not sufficiently match the candidate itinerary for further processing associated with the candidate itinerary.

The matching engine 140 may also score the trips to determine the trips that map best to each itinerary. By identifying actual trips taken by computing devices that map to an itinerary, the matching engine 140 can select an itinerary that corresponds to an actual trip taken by computing devices. In some implementations, the matching engine 140 may be configured to execute an expectation maximization technique that allows for assigning trips to itineraries based on durations. This may allow the matching engine 140 to estimate the duration for each itinerary while also measuring similarity between each trip and each itinerary.

In addition to assigning trips and estimating duration parameters, the expectation maximization technique can generate a mixing parameter for each candidate itinerary. This mixing parameter can count the number of trips that are best described by the itinerary, weighted by how well the itinerary fits each trip. The weight may be further normalized across itineraries. The matching engine 140 may then rank by descending mixing parameter in order to identify the most popular itineraries that also explain their contributing trips well.

The data processing system 120 can be configured with additional techniques to score and rank candidate itineraries without mapping an actual trip to an itinerary. These techniques may include using signals such as a tourist score for entities in the itinerary, time spent in transit versus time spent in entities in the itinerary, the popularity of an entity in the itinerary as measured by the number of visitors to the entity, etc. The data processing system 120 can determine a tourist score for an entity by using the number of online or web references referring to that entity (e.g., how often the entity is referred to on travel websites) or the number of photos taken at or near that entity, for example. Increased transit time may as compared to time spent at the entity may lower the score. For example, if a computing device spends 12 hours in transit to an entity, but only spends one day at the entity, then the matching engine 140 may determine to lower the score because the entity may not be worth the trip. An entity with a relatively high number of visitors (as compared to other nearby entities or other entities on the trip) may receive a higher score by virtue of being more popular.

After generating scores for the itineraries, the matching engine 140 can iteratively select itineraries by their ranked order while skipping (or annotating as matching) candidate itineraries that are similar to itineraries already included. Thus, the matching engine 140 can select a diverse set of itineraries to provide in response to the search query.

For example, once the matching engine 140 ranks the itineraries by popularity and how well they fit their contributing trips, and estimate their duration parameters, the matching engine 140 may choose or select a high quality, relatively diverse subset to show to a user of the computing device that input the search query. The matching engine 140 may first discard itineraries that were not assigned trips from at least 50 unique computing devices. Thus, the itineraries that are selected are appropriately aggregated in nature and anonymous.

Then, the matching engine 140 can remove candidate itineraries that are not sufficiently geo-diverse. The matching engine 140 can determine whether an individual candidate itinerary is geo-diverse. For example, if some or all pairs of entities in a first itinerary are relatively close to one another with respect to a destination container, then the matching engine 140 may remove the first itinerary from the candidate itineraries. In some implementations, the data processing system 120 can determine a candidate itinerary to be meaningful if any pair of entities in the itinerary is sufficiently different or geo-diverse from remaining pairs of entities in the candidate itinerary. The data processing system 120 may deem a pair of entities to be relatively close if the entities are within a geo-diversity threshold. The data processing system 120 can dynamically determine the geo-diversity threshold based on the size of a destination container. If the destination container is small, e.g., Northern California, entities in the itinerary can be closer together than if the destination container is large, e.g., United States). In an illustrative, non-limiting implementation, the geo-diversity threshold may be, e.g., 1 km, 3 km, 5 km, 10 km, 20 kin, 30 km or a value between about 500 meters to 100 km. The data processing system 120 can determine a distance between the pair of entities using an address of the entities or latitude and longitude coordinates of the entities, compare the distance with the geo-diversity threshold, and responsive to the comparison, determine that the pair of entities are not sufficiently geo-diverse if the distance is less than or equal to the geo-diversity threshold. Thus, a candidate itinerary could be meaningful if any pair of entities <E1, E2> in the candidate itinerary is far enough apart, e.g., E1 is far enough apart from E2, with respect to the size of the destination container. The data processing system 120 can select a first entity in the candidate itinerary, and a second entity in the candidate itinerary, compare the distance between the two entities, and if the distance satisfies the geo-diversity threshold, the system can select a third entity and compare the third entity with the first entity, and so on. However, responsive to the determination that all pairs of entities within an individual candidate itinerary are not sufficiently geo-diverse, the data processing system 120 can remove the itinerary from the set of candidate of itineraries.

Next, the matching engine 140 may also enforce diversity across itineraries by walking through the ranked list of candidate itineraries in order, and removing those candidate itineraries that are relatively redundant with previously selected candidates. One way to do this is to threshold on the Jaccard similarity between itineraries, discarding those itineraries that overlap too much with earlier choices. Another example may be to discard itineraries that are a subset of a higher-ranking itinerary. Thus, the matching engine 140 would identify all three of the following itineraries and not discard any for being too similar: 11: Los Angeles, San Francisco, Monterey; 12: Los Angeles, San Francisco, San Diego; and 13: Los Angeles, San Francisco, Santa Barbara.

In some implementations, the matching engine 140 may identify itineraries based on one or more categories. Categories may include, e.g., beach, hiking, museums, wine, or other interests. The matching engine 140 may first determine or compute the top categories mined from actual trips to provide a set of relevant categories for selection, as shown in FIG. 2B element 285. Itineraries may include or be associated with a geographic location (travel destination) and a category that is predetermined. The category may be predetermined based on a travel entity repository or other resource. The matching engine 140 can use the category information associated with each entity to identify one or more dominant categories of an itinerary. The matching engine 140 can then rank the itineraries based on the categories. For example, the matching engine 140 can identify an entity that is best for hiking, or best for museums, etc.

In some instances, the matching engine 140 can calculate for each category the aggregated time spent in entities associated with the categories. The matching engine 140 may further factor in a previously calculated score capturing the value and relevance of the category with respect to an entity and its significance across entities. The matching engine 140 can then score candidate itineraries based on specified (or dynamically selected) set of categories. The matching engine 140 can then reweight the precomputed categories' scores relative to the categories that were selected. Thus, given an itinerary, for each selected category, the matching engine 140 can determine or compute the aggregated score of time spent and an importance of the category across all entities containing the category.

Therefore, the matching engine 140 can identify itineraries that are more relevant to a category. Responsive to receiving a selection or identification of a category from a user of a computing device requesting an itinerary or location sequence, the matching engine 140 can select an itinerary corresponding to the selected category to provide to the computing device 110.

FIG. 2A is an illustration of a graphical user interface of a system for optimization of generation of a travel itinerary in accordance with an implementation. The user interface 200 may be displayed via a web browser on a computing device 110. The user interface 200 may be displayed via an application executing on a computing device 110, such as a mobile application. The user interface 200 includes an input search box 205 where a user of the computing device 110 may input a search query. In some implementations, the input search box 205 may include the input to a search engine. Responsive to receiving an input via the input search box 205, the data processing system 120 can generate itineraries. In this illustration, the input query is "two weeks in Italy", which includes a temporal constraint of two weeks and a travel destination of Italy. The data processing system 120 identifies itineraries, such as Italy itineraries>Most Popular 210. The data processing system 120 may provide itineraries selected based on other criteria such as a category, which may be selected via drop down menu button 215. The data processing system 120 may similarly provide a temporal constraint drop down menu 225 that allows for changing the selection of the temporal constraint "stay 2 weeks" 220.

The data processing system 120 may provide illustrative maps 230, 235, and 240 that show various itineraries based on or responsive to the temporal constraint, travel destination, and category. The data processing system 120 may provide additional information about each itinerary, as shown in text boxes 245, 250 and 255. For example, itinerary 230 includes entities Rome, Florence and Venice. In this example, Florence and Venice include two additional entities grouped closely together. The text box may provide additional entities or sites associated with these travel entities, such as Colosseum. The Vatican, Michelangelo, Renaissance art, Gondola, Rialto Bridge, and Vivaldi.

FIG. 2B is another illustration of a graphical user interface 201 of a system for optimization of generation of a travel itinerary in accordance with an implementation. The data processing system 120 can provide an input search box 260 for an input search query, such as "two weeks in Italy". In this example, the data processing system 120 can provide Italy itineraries that include top sights 265. The itinerary or location sequence 265 may include entities, a duration to stay at each entity, and top sights associated with each entity, such as: Rome 4 days, Florence 3 days, Venice 3 days, Siena 2 days, and Padua 2 days. Each entity may further include top sights, such as Rome: Ruins, Colosseum, Ancient history, Saint Peters Basilica, and Vatican.

The interface 201 further includes drop down boxes for temporal constraint 270 that can provide various temporal options 275 such as: A weekend, A long, weekend, 1 week, 2 weeks, 3 weeks, input days, or time of year. In some instances, the data processing system 120 can identify the most common durations based on actual trips and list them in dialog box 275. The data processing system 120 can further generate a user interface element for categories 285, which can be modified based on drop down menu 280. In this example, the category shows "top sights", but other categories may include, e.g., beach, art & culture, food & wine, and nightlife, as shown in interface element 285. These categories may be generated or determined based on popular predetermined categories associated with entities corresponding to the destination input into the search engine based on actual trips.

Figure 3:
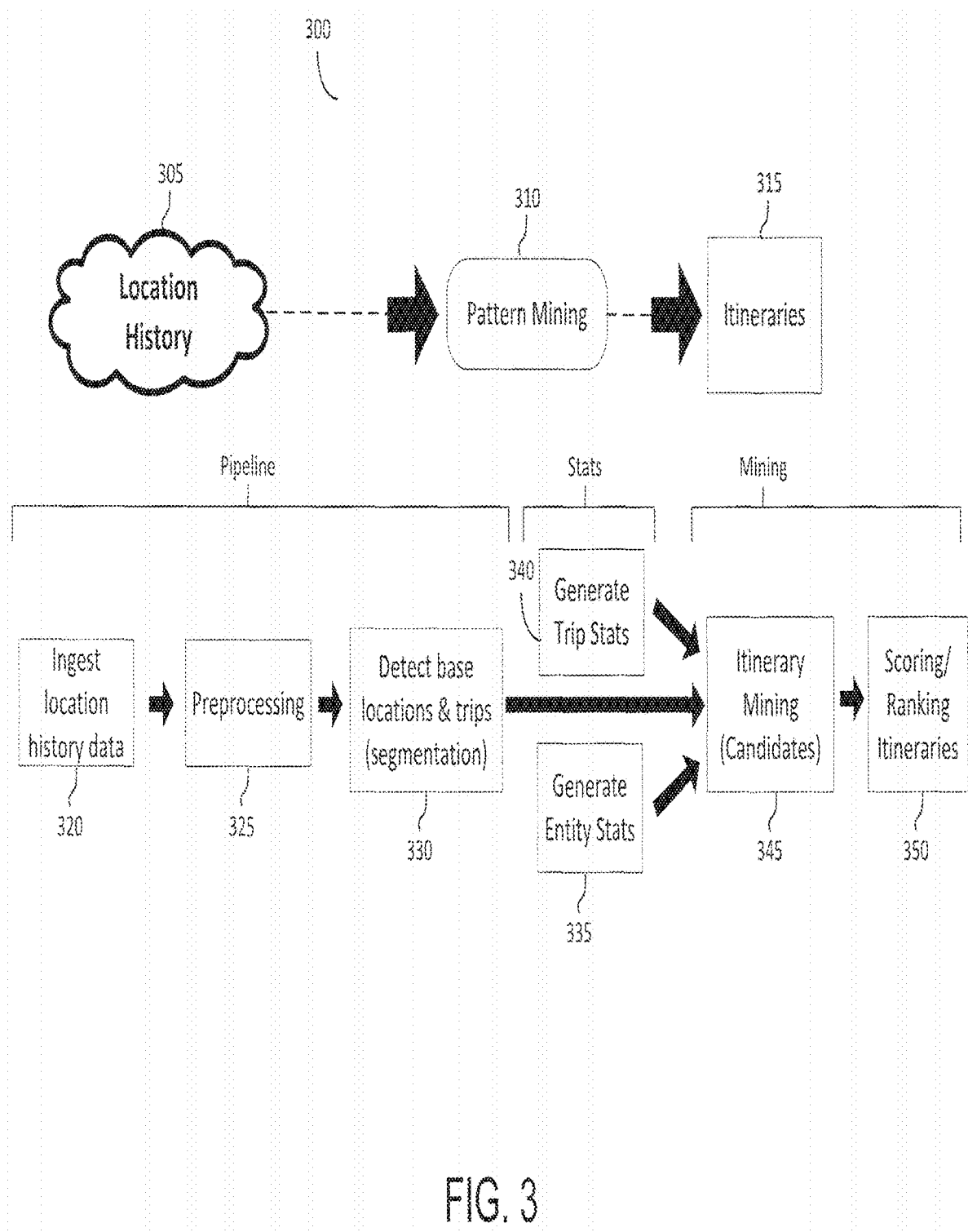
FIG. 3 shows an illustration of a flow chart for optimizing generation of a travel itinerary in accordance with an implementation.

FIG. 3 shows an illustration of a flow chart for optimizing generation of a travel itinerary in accordance with an implementation. The flow chart may be performed by data processing system 120 shown in FIG. 1. At act 305, the system receives and sets up location history data. This may include ingesting location history data from a plurality of computing devices at act 320. At act 325, this received location history data is preprocessed by removing insufficient data. For example, if the location history data is missing information such as a travel mode, time stamp, or other information, the system may filter it out. At act 330, the system can determine base locations and trips (e.g., using temporal thresholds or distance thresholds), and separate or flag the two data sets. At acts 335 and 340 the system can aggregate statistics across computing devices and trip parameters, such as generating trip statistics at act 340, and generating entity statistics at act 335. At act 310, the system can perform pattern mining to generate itinerary mining candidates and ultimately score/rank itineraries to provide them to a computing device at act 315.

As discussed with reference to FIG. 1, the data processing system 120 can score/rank itineraries by taking into account one or more factors such as popularity, sensitivity to requested length, sensitivity to selected categories, diversity, practicality, coverage, etc. Popularity may refer to the number of trips actually completed corresponding to the itinerary. Sensitivity to requested length may correspond to how closely the total duration of the itinerary matches the requested duration in the search query or other user input. Sensitivity to selected categories may refer to how closely the categories of the entities of the travel itinerary match a category selected by a user. Diversity may refer to how different the selected itineraries are from one other; e.g., the data processing system 120 may attempt to provide different itineraries by determining whether a second itinerary is subset of the first itinerary, and removing, the second itinerary or preventing it from being displayed. The practicality may refer to how close the various entities in an itinerary are from one other; transit times versus time spent at an itinerary (e.g., if a transit time is greater than time spent at an entity by some factor based on location history, then it may be less practical). Coverage may refer to covering more sites at a destination (e.g., going to four travel destination within Italy may be preferred for a 2 week trip to Italy as compared to going to only 1 destination).

Figure 10:
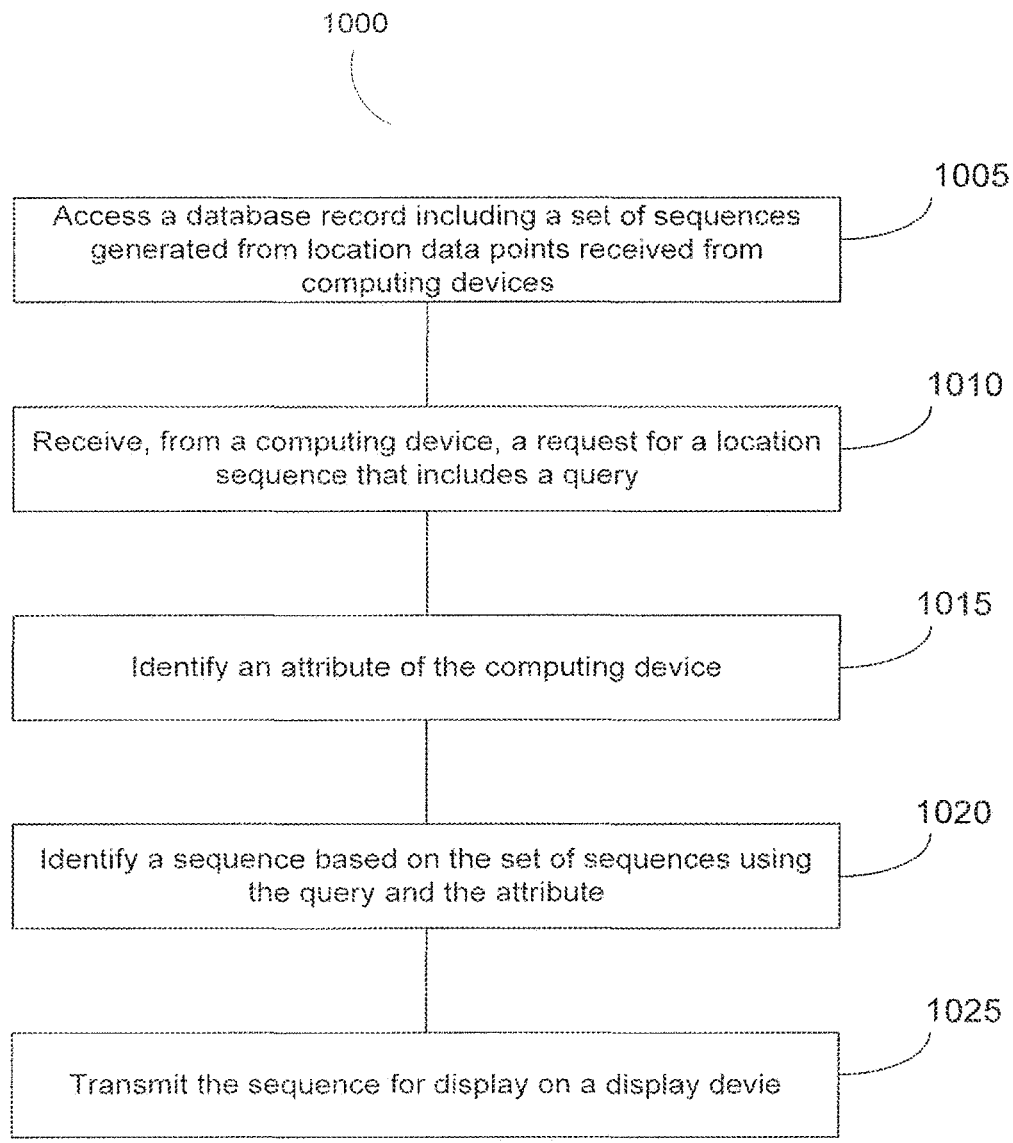
FIG. 10 is an illustration of a method of optimizing generation of travel itineraries in accordance with an implementation.

FIG. 10 is an illustration of a method 1000 of optimizing generation of travel itineraries in accordance with an implementation. The method 1000 may be performed by system 100 or data processing system 120, or one or more components thereof, illustrated in FIG. 1. In brief overview, at act 1005 a data processing system 120 accesses a database record including a set of sequences generated from location data points received from computing devices. At act 1010, the data processing system 120 receives, from a computing device, a request for a location sequence that includes a query. At act 1015, the data processing system 120 identifies an attribute of the computing device. At act 1020, the data processing system 120 identifies a sequence based on the set of sequences using the query and the attribute of the computing device. The data processing system 120 can infer or summarize one or more popular itineraries from the set of sequences to identify or generate the sequence. At act 1025, the data processing system 120 transmits the sequence for display on a display device of the computing device.

In further detail, at act 1005 the data processing system 120 accesses a database record including a set of sequences. The set of sequences may have been generated from location data points received from multiple computing devices. The set of sequences may include several sequences, where each sequence includes one or more travel entities (or locations) and a duration of time associated with each travel entity. Each sequence may correspond to or be generated based on location data points aggregated from multiple computing devices, such as greater than a threshold number of computing devices (e.g., 50 devices, 100 devices, 75 devices, or some other threshold number). The data processing system 120 can generate the set sequences by mining sets of entities associated with actual trips.

In one implementation, the data processing system 120 identifies a first sequence in the set of sequences that includes a first duration for a first travel entity or location, and a second duration for a second entity or location. For example, the sequence may include Rome (4 days) and Florence (3 days), and this sequence may be inferred or generated based on actual trips taken by, e.g., 1000 computing devices determined based on analyzing location data points received from such computing devices. The data processing system 120 may determine that this sequence maps to a threshold number of actual trips, where each such trip is determined to be sufficiently similar to the sequence (e.g., using a Jaccard similarity technique). Responsive to this determination, the data processing system 120 can store the sequence in the data record.

At act 1010, the data processing system 120 may receive a request for a location sequence. The data processing system 120 may receive the request from a computing device via a network. In some cases, the data processing system 120 receives a search query that includes a temporal constraint or a destination, and determines that the search query is a request for a location sequence or travel itinerary. Thus, in some cases, receiving a search query with a travel destination or temporal constraint may represent receiving a request for a location sequence. The data processing system 120 may forward this request to a matching engine 140 of the data processing system 120 or otherwise process this request.

The data processing system 120 may process or analyze the query to identify a temporal constraint using semantic processing or keyword processing or entity processing. For example, the data processing system 120 may parse the search query to identify a travel destination based on a keyword or entity of the search query, and mapping the keyword or entity to a travel entity repository. The data processing system 120 may further parse the query to identify temporal Keywords or terms such as "weeks", "days", "duration", "stay", "length" "time", or "long", for example. In some cases, the data processing system 120 can perform semantic analysis or probabilistic latent semantic analysis techniques to determine a travel destination and a temporal constraint.

At act 1015, the data processing system 120 identifies an attribute of the computing device. The attribute may include, e.g., a base location of the computing device, a current location of the computing device, a type of computing device, a work location, a mode (e.g., driving, walking, still), etc. A base location may represent a location at which the computing device spends greater than a threshold amount of time, such as 10%, 20%, 30%, etc. The data processing system 120 may determine the base location based on historical location data points or observations received from the computing device. For example, the computing device, or user thereof, may opt-in to providing location information for this purpose. In some instances, the data processing may receiving an indication from the computing device regarding the attribute; e.g., a user may input their base location via an interface provided by the data processing system 120, such as in a profile associated with the computing device.

At act 1020, the data processing system 120 (e.g., via a matching engine 140) identifies one or more sequences based on the set of sequences using the query and the attribute. The data processing system 120 may select a first sequence based on the temporal constraint of the query. For example, the data processing system 120 may identify, from the set of sequences stored in a database or repository, candidate sequences that have the same or similar duration as the temporal constraint in the search query, the same travel destination as in the query, and also correspond to the same attribute (e.g., sets of sequences having the same base location as the computing device). These sets of sequences stored in the database may be generated by mining or aggregating actual trips taken by several computing devices and making inferences based on those trips. The data processing system 120 may further filter the sequences based on a category, such as beach, hiking, museums, historic sites, wine, food, family friendly, etc. In some implementations, the data processing system 120 may receive additional criteria or attributes via an interface, such as the interfaces illustrated in FIGS. 2A and 2B.

Upon identifying the set of candidate sequences based on these criteria, the data processing system 120 may further select a sequence from the set of sequences based on additional criteria, such as the most popular sequence (e.g., frequency of occurrence or number of actual trips corresponding to the sequence, number of references to the entities of the sequence on travel Websites, number of photos taken at or near the entities of the sequence), highest rated sequence (e.g., based on user feedback), similarity to category, etc. In some implementations the data processing system 120 can select multiple sequences. To identify multiple sequences, data processing system 120 may remove similar sequences (e.g., using a numerical Jaccard similarity technique).

At act 1025, the data processing system 120 transmits the selected location sequence or multiple sequences for presentation via the computing device. In some implementations, the data processing system 120 may provide illustrative maps along with the one or more sequences, as well as additional information, as illustrated in FIG. 2. For example, the data processing system 120 may transmit the location sequence for display on a display device such as a screen or monitor communicatively coupled with the computing device associated with the request.

Figure 11:
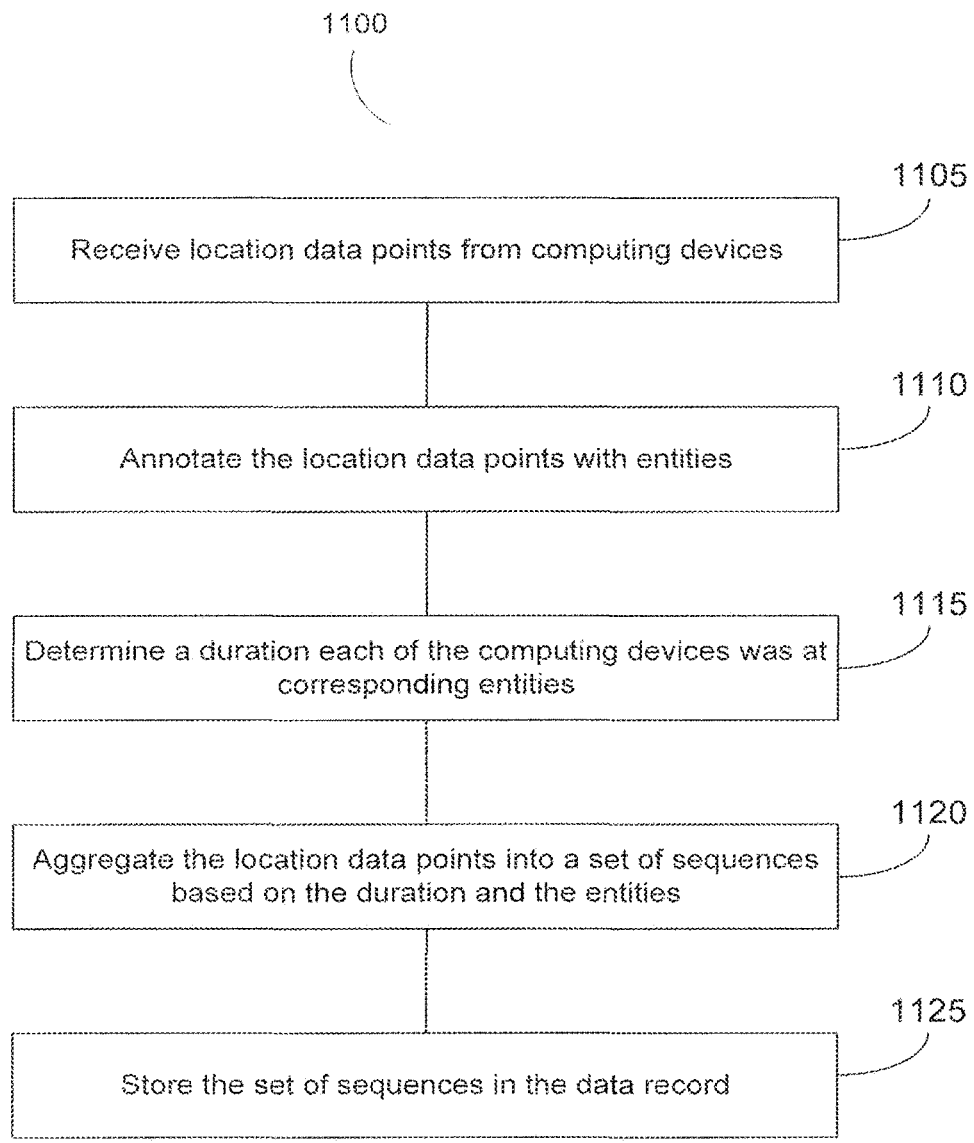
FIG. 11 is an illustration of a method of facilitating generation of travel itineraries in accordance with an implementation.

FIG. 11 is an illustration of a method 1100 of facilitating generation of travel itineraries in accordance with an implementation. The method 1100 may be performed by system 100 or data processing system 120, or one or more components thereof, illustrated in FIG. 1. In brief overview, at act 1105, the data processing system 120 receives location data points from computing devices. At act 1110, the data processing system 120 annotates the location data points with entities. At act 1115, the data processing system 120 determines a duration each of the computing devices was at corresponding entities. At act 1120, the data processing system 120 mines or aggregates the location data points to generate a set of sequences based on the duration and the entities. At act 1125, the data processing system 120 stores the set of sequences into a data record or database.

In further detail, at act 1105, the data processing system 120 receives location data points from each of a plurality of computing devices. The data processing system 120 may receive the location data points in real-time, based on a time interval, upon request, responsive to an event or trigger (e.g., when the computing device accesses a resource via network). In some implementations, the location data point may include or represent an observation, or the data processing system 120 may generate or determine an observation based on a received location data point. The observation may include, e.g., a latitude and longitude coordinate, a timestamp for the coordinate, and a mode of the computing device. Modes of the computing device may include walking, driving, or still. In some implementations, the computing device may transmit the mode. For example, the computing device may include one or more sensors such as GPS sensors, accelerometers, a motion engine, step counters, barometers, altimeters that can be used to determine a mode. For example, the data processing system 120 may determine, by using measurements from the accelerometer, than the computing device is in a car that is driving (e.g., by integrating acceleration to determine velocity, and comparing determined velocity with a threshold that indicates driving, such as 35 miles per hour). In some implementations, the data processing system 120 may determine the mode based on sensor readings or location coordinates; e.g., the data processing system 120 may analyze subsequent or closely related lat/long coordinates and corresponding timestamps to determine that a computing device is still or walking (e.g., speed threshold for walking).

In some implementations, the data processing system 120 can filter the received location data points to segregate them into trips and base locations. The data processing system 120 can use a temporal threshold or a distance threshold. For example, location data points corresponding to where a computing device spends greater than 10% or some time or temporal threshold (e.g., the temporal threshold may be a value or percentage between about 10% and 50%) of time over the course of a time interval (e.g., 30 days, 45 days, 60 days, etc.) ay correspond to a base location. The data processing system 120 may then identify a trip using a distance threshold (e.g., a distance threshold may be a value between about 50 km and 150 km). For example, an observation made greater than or equal to the distance threshold (such as 100 km) from the base location may trigger a trip, and subsequent observations within a certain radius of the first observation triggering the trip may be clustered together with the trip.

At act 1110, the data processing system 120 (e.g., via an entity engine 145) annotates the location data points with entities. The entities may include those entities that are travel entities stored in a travel entity repository. The travel entity repository may be a curated repository storing travel entities. Travel entities may include, e.g., a point of interest, a city, a state, a country, or a geographic region. The data processing system 120 may identify a latitude and longitude coordinate of the entity, and map the lat/long to a cell. The data processing system 120 may then identify a travel entity corresponding to the cell. In some cases, the cell may have a fixed granularity or size.

At act 1115 the data processing system 120 (e.g., via a location engine 150) determines a duration each of the plurality of computing devices was at corresponding entities using a probabilistic technique. The data processing system 120 may utilize a smearing technique to estimate a duration for each entity based on a location data point or an observation. The data processing system 120 may sum or combine multiple location data points to improve the duration estimate.

The data processing system 120, at act 1120, can aggregate the location data points from each of the plurality of computing devices to generate the set of sequences based on the duration and the entities. For example, each sequence in the set of sequences may sufficiently map to a number of actual trips taken by computing device based on a Jaccard similarity. The data processing system 120 may identify trips with similar durations and entities and group them together. The data processing system 120 may then store the set of sequences in a data record, such as in a database, data structure or other storage device. Once stored, the data processing system 120 can, e.g., via process 1000 shown in FIG. 10, provide a travel itinerary response to a request from a computing device.

Figure 12:
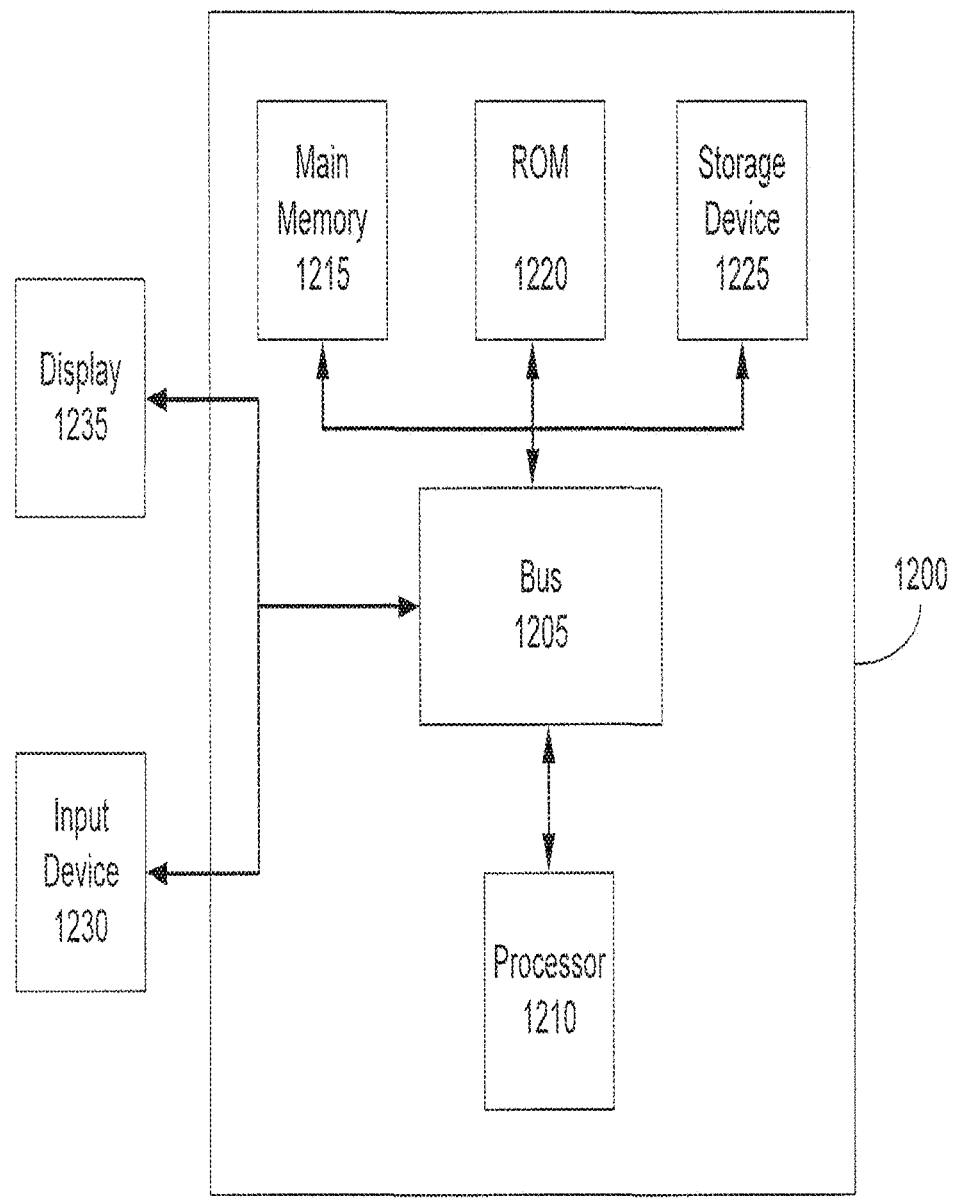
FIG. 12 is a block diagram illustrating a general architecture for a computer system that may be employed to implement various elements of the system shown in FIG. 1 and the methods shown in FIGS. 10 and 11, among others, in accordance with an implementation.

FIG. 12 is a block diagram of a computer system 1200 in accordance with an illustrative implementation. The computer system or computing device 1200 can be used to implement the system 100, content provider 125, computing device 110, content publisher 115, data processing system 120, interface 135, matching engine 140, entity engine 145, location engine 150, and database 155. The computing system 1200 includes a bus 1205 or other communication component for communicating information and a processor 1210 or processing circuit coupled to the bus 1205 for processing information. The computing system 1200 can also include one or more processors 1210 or processing circuits coupled to the bus for processing information. The computing system 1200 also includes main memory 1215, such as a random access memory (RAM) or other dynamic storage device, coupled to the bus 1205 for storing information, and instructions to be executed by the processor 1210. Main memory 1215 can also be used for storing position information, temporary variables, or other intermediate information during execution of instructions by the processor 1210. The computing system 1200 may further include a read only memory (ROM) 1220 or other static storage device coupled to the bus 1205 for storing static information and instructions for the processor 1210. A storage device 1225, such as a solid state device, magnetic disk or optical disk, is coupled to the bus 1205 for persistently storing information and instructions.

The computing system 1200 may be coupled via the bus 1205 to a display 1235, such as a liquid crystal display, or active matrix display, for displaying information to a user. An input device 1230, such as a keyboard including alphanumeric and other keys, may be coupled to the bus 1205 for communicating information and command selections to the processor 1210. The input device 1230 can include a touch screen display 1235. The input device 1230 can also include a cursor control, such as a mouse, a trackball, or cursor direction keys, for communicating direction information and command selections to the processor 1210 and for controlling cursor movement on the display 1235.

The processes, systems and methods described herein can be implemented by the computing system 1200 in response to the processor 1210 executing an arrangement of instructions contained in main memory 1215. Such instructions can be read into main memory 1215 from another computer-readable medium, such as the storage device 1225. Execution of the arrangement of instructions contained am memory 1215 causes the computing system 1200 to perform the illustrative processes described herein. One or more processors in a multi-processing arrangement may also be employed to execute the instructions contained in main memory 1215. In alternative implementations, hard-wired circuitry may be used in place of or in combination with software instructions to effect illustrative implementations. Thus, implementations are not limited to any specific combination of hardware circuitry and software.

Although an example computing system has been described in FIG. 12, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware code that creates an execution environment for the computer program in question, e.g., code that constitutes processor firmware, a protocol stack, a database management system, an operating system, a cross-platform runtime environment, virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method to optimize generation of itineraries, comprising, by one or more computing devices:
    accessing a set of sequences generated from location data points received from a plurality of user computing devices, each sequence in the set of sequences identifying a plurality of durations corresponding to a plurality of locations;
    grouping the location data points into cells of a geographic map, each cell associated with a corresponding entity;
    determining a duration for each of the plurality of user computing devices at each entity using a multiscale smearing technique based on modeling, for each location data point, a likelihood over a configured amount of time that a corresponding user computing device leaves a cell corresponding to the location data point;
    determining a median duration for each entity based on the duration for each of the plurality of user computing devices at each entity;
    receiving, from a user computing device, a request for a sequence, the request comprising a query and location data of the user computing device;
    generating, in response to the query, a first sequence based on the location data of the user computing device and the determined median duration for each entity, the first sequence
    including a first duration corresponding to a first location, and a second duration corresponding to a second location; and
    transmitting, responsive to the request, the first sequence for display on the user computing device.

2. The method of claim 1, further comprising, by the one or more computing devices:
    identifying a temporal constraint based on the query; and
    selecting the first sequence based on the temporal constraint.

3. The method of claim 1, further comprising, by the one or more computing devices:
    selecting a plurality of geo-diverse sequences using the query and the attribute; and
    transmitting the plurality of geo-diverse sequences for display on the display device.

4. The method of claim 1, further comprising, by the one or more computing devices:
    receiving the location data points, the location data points corresponding to trips taken by the plurality of user computing devices;
    applying a frequent itemset mining technique to the plurality of location data points to generate unordered sets of locations;
    comparing each of the trips with the unordered sets of locations to determine a similarity; and
    generating the set of sequences responsive to the similarity of each of the trips to the unordered sets of locations satisfying a similarity threshold.

5. The method of claim 4, further comprising, by the one or more computing devices:
    generating a mixing parameter for each of the unordered sets of locations using a first expectation maximization technique; and
    determining durations for locations of the unordered sets of locations using a second expectation maximization technique.

6. The method of claim 1, further comprising determining, by the one or more computing devices for the user computing device, the attribute based on a location that satisfies a temporal threshold.

7. The method of claim 1, further comprising identifying, by the one or more computing devices, the location of the user computing device associated with the query.

8. The method of claim 1, wherein the first sequence is displayed via a display device communicatively coupled to the user computing device.

9. The method of claim 1, further comprising, by the one or more computing devices:
    receiving, via an interface, the location data points from each of the plurality of user computing devices;
    annotating, by an entity engine, the location data points with entities;
    determining, by a location engine, a duration each of the plurality of computing devices was at corresponding entities using a probabilistic technique;
    aggregating, by the location engine, the location data points from each of the plurality of computing devices into the set of sequences based on the duration and the entities; and
    storing the set of sequences in the data record.

10. The method of claim 9, further comprising, by the one or more computing devices:
    filtering the location data points based on a distance threshold to identify the location data points corresponding to trips; and
    aggregating the location data points corresponding to trips to generate the set of sequences.

11. The method of claim 9, further comprising, by the one or more computing devices:
    filtering the location data points based on a temporal threshold and a distance threshold to identify the location data points corresponding to trips; and
    aggregating the location data points corresponding to each trip to generate the set of sequences.

12. A system to optimize generation of a travel itineraries, comprising:
    a storage medium; and
    a processor configured to execute application code instructions stored in the storage medium to cause the system to:
    access a set of sequences generated from location data points received from a plurality of user computing devices, each sequence in the set of sequences identifying a plurality of durations corresponding to a plurality of locations;
    group the location data points into cells of a geographic map, each cell associated with a corresponding entity;
    determine a duration for each of the plurality of user computing devices at each entity using a multiscale smearing technique based on modeling, for each location data point, a likelihood over a configured amount of time that a corresponding user computing device leaves a cell corresponding to the location data point;

determine a median duration for each entity based on the duration for each of the plurality of user computing devices at each entity;

receive, from a user computing device, a request for a sequence, the request comprising a query and location data of the user computing device;

generate, in response to the query, a first sequence based on the location data of the user computing device and the determined median duration for each entity, the first sequence including a first duration corresponding to a first location, and a second duration corresponding to a second location; and transmit, responsive to the request, the first sequence for display on the user computing device.

13. The system of claim 12, wherein the processor is further configured to execute application code instructions stored in the storage medium to cause the system to:

annotate the location data points with entities, the entities comprise at least one of a point of interest, a city, a state, a country, or a geographic region.

14. The system of claim 12, wherein the processor is further configured to execute application code instructions stored in the storage medium to cause the system to:

receive the location data points, the location data points corresponding to trips taken by the plurality of computing devices;

apply a frequent itemset mining technique to the plurality of location data points to generate unordered sets of locations;

compare each of the trips with the unordered sets of locations to determine a similarity; and generate the set of sequences responsive to the similarity of each of the trips to the unordered sets of locations satisfying a similarity threshold.

15. The system of claim 14, wherein the processor is further configured to execute application code instructions stored in the storage medium to cause the system to:

generate a mixing parameter for each of the unordered sets of location using a first expectation maximization technique; and determine durations for locations of the unordered sets of locations using a second expectation maximization technique.

16. The system of claim 12, wherein the processor is further configured to execute application code instructions stored in the storage medium to cause the system to determine, for the computing device, the attribute based on a location that satisfies a temporal threshold.

17. The system of claim 12, further comprising:

an interface of the system configured to receive the location data points from each of the plurality of computing devices;

an entity engine of the system configured to annotate the location data points with entities;

a location engine of the system configured to determine a duration each of the plurality of computing devices was at corresponding entities using a probabilistic technique, and aggregate the location data points from each of the plurality of computing devices into the set of sequences based on the duration and the entities; and wherein the processor is further configured to execute application code instructions stored in the storage medium to cause the system to store, in the data record, the set of sequences.

18. The system of claim 17, wherein the processor is further configured to execute application code instructions stored in the storage medium to cause the system to:

filter the location data points based on a distance threshold to identify the location data points corresponding to trips; and aggregate the location data points corresponding to trips to generate the set of sequences.

19. The system of claim 18, wherein the data processing system is further configured to:

group the location data points into cells having a fixed granularity.

20. One or more non-transitory computer readable media that collectively store instructions that when executed by one or more processors cause the one or more processors to perform operations, the operations comprising:

accessing a set of sequences generated from location data points received from a plurality of user computing devices, each sequence in the set of sequences identifying a plurality of durations corresponding to a plurality of locations;

grouping the location data points into cells of a geographic map, each cell associated with a corresponding entity;

determining a duration for each of the plurality of user computing devices at each entity using a multiscale smearing technique based on modeling, for each location data point, a likelihood over a configured amount of time that a corresponding user computing device leaves a cell corresponding to the location data point;

determining a median duration for each entity based on the duration for each of the plurality of user computing devices at each entity;

receiving, from a user computing device, a request for a sequence, the request comprising a query and location data of the user computing device;

generating, in response to the query, a first sequence based on the location data of the user computing device and the determined median duration for each entity, the first sequence including a first duration corresponding to a first location, and a second duration corresponding to a second location; and transmitting, responsive to the request, the first sequence for display on the user computing device.

* * * * *